(12) United States Patent
Horn et al.

(10) Patent No.: US 11,923,619 B2
(45) Date of Patent: Mar. 5, 2024

(54) BUTLER MATRIX STEERING FOR MULTIPLE ANTENNAS

(71) Applicant: QUALCOMM Incorporated, San Diego, CA (US)

(72) Inventors: Idan Michael Horn, Hod Hasharon (IL); Shay Landis, Hod Hasharon (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 174 days.

(21) Appl. No.: 17/126,983

(22) Filed: Dec. 18, 2020

(65) Prior Publication Data

US 2022/0200147 A1  Jun. 23, 2022

(51) Int. Cl.
  *H01Q 3/40* (2006.01)
  *H04B 7/0417* (2017.01)
  *H04B 7/06* (2006.01)

(52) U.S. Cl.
  CPC ............ *H01Q 3/40* (2013.01); *H04B 7/0421* (2013.01); *H04B 7/0617* (2013.01)

(58) Field of Classification Search
  CPC ...... H01Q 3/40; H04B 7/0421; H04B 7/0617; H04B 7/0695; H04B 7/086; H04B 7/088
  USPC ......................................................... 343/777
  See application file for complete search history.

(56) References Cited

U.S. PATENT DOCUMENTS

| | | | |
|---|---|---|---|
| 5,610,617 A | 3/1997 | Gans et al. | |
| 6,218,987 B1 | 4/2001 | Derneryd et al. | |
| 6,992,622 B1 | 1/2006 | Chiang et al. | |
| 8,013,754 B2 | 9/2011 | Shum et al. | |
| 10,566,693 B2 | 2/2020 | Tsai et al. | |
| 10,879,627 B1 * | 12/2020 | Frigon .................. | H01Q 21/08 |
| 11,114,759 B1 | 9/2021 | Horn et al. | |
| 2002/0163478 A1 | 11/2002 | Pleva et al. | |
| 2003/0038752 A1 | 2/2003 | Park | |

(Continued)

FOREIGN PATENT DOCUMENTS

EP  3675280 A1  7/2020

OTHER PUBLICATIONS

International Search Report and Written Opinion—PCT/US2021/060269—ISA/EPO—dated Mar. 26, 2022.

(Continued)

*Primary Examiner* — Fitwi Y Hailegiorgis
(74) *Attorney, Agent, or Firm* — Loza & Loza LLP/QUALCOMM Incorporated

(57) ABSTRACT

Aspects of disclosure relate to beam steering at a multi-antenna device. The device receives an activation signal to activate one or more input ports of a Butler matrix and outputs signals from all output ports of the Butler matrix based on activation of the one or more input ports. The signals output from the output ports have varying phase shifts relative to each other. Moreover, the device phase shifts the signals output from the output ports via a plurality of phase shifters respectively coupled to the output ports. The phase shifted signals have further varying phase shifts relative to each other and a phase difference between adjacent phase shifted signals. Each one of a plurality of antenna elements at the device receives a phase shifted signal from an associated phase shifter and outputs a beam based on the phase shifted signal received from the associated phase shifter.

30 Claims, 12 Drawing Sheets

(56) References Cited

U.S. PATENT DOCUMENTS

| | | |
|---|---|---|
| 2004/0110469 A1 | 6/2004 | Judd et al. |
| 2009/0322608 A1* | 12/2009 | Adams .................. H01Q 1/246 |
| | | 342/368 |
| 2010/0321238 A1 | 12/2010 | Shen |
| 2012/0112963 A1 | 5/2012 | Lee et al. |
| 2013/0076565 A1 | 3/2013 | Lee et al. |
| 2014/0320346 A1* | 10/2014 | Caille ................ G02B 6/29386 |
| | | 385/24 |

OTHER PUBLICATIONS

Fakoukakis F.E., et al., "Development of an Adaptive and a Switched Beam Smart Antenna System for Wireless Communications", Journal of Electromagnetic Waves and Applications, [Online], vol. 20, No. 3, Aug. 22, 2005, (Aug. 22, 2005), pp. 399-408, XP055835997, 5 Pages, NL ISSN: 0920-5071, DOI: 10.1163/156939306775701722 Abstract Introduction, p. 1 p. 1, last paragraph-p. 2, paragraph first, figure 1 p. 3, table 1.
International Search Report and Written Opinion—PCT/US2021/034296—ISA/EPO—dated Sep. 8, 2021.

* cited by examiner

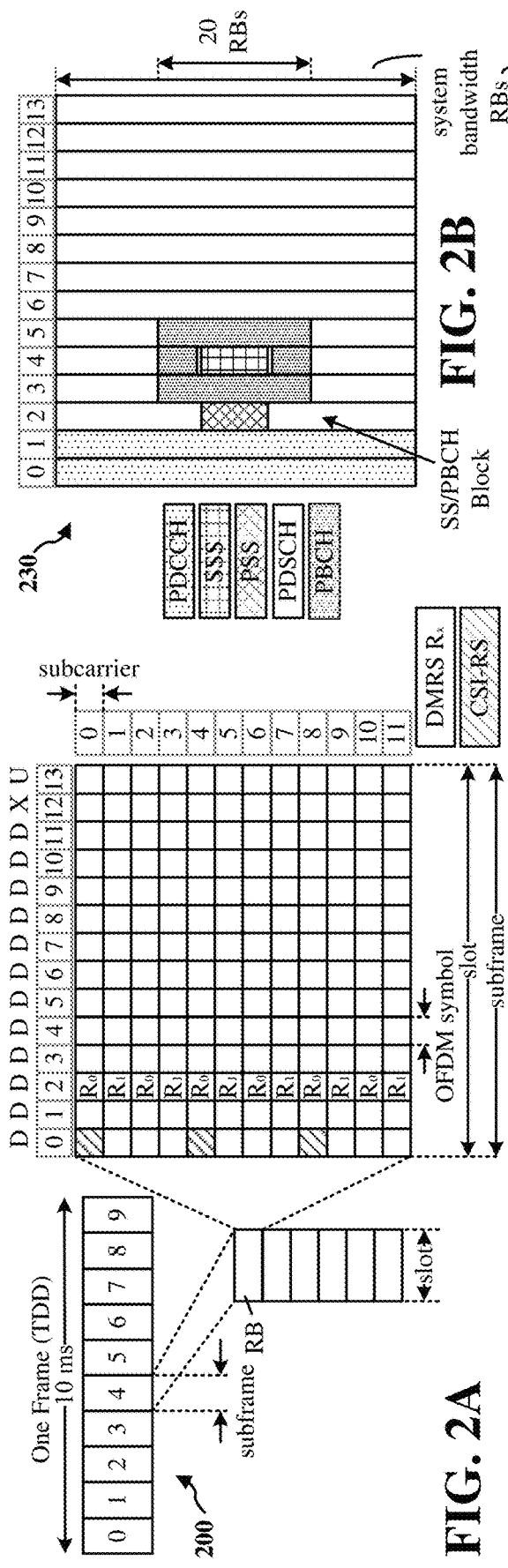
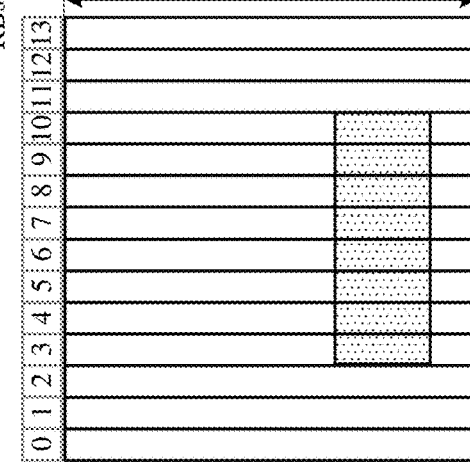
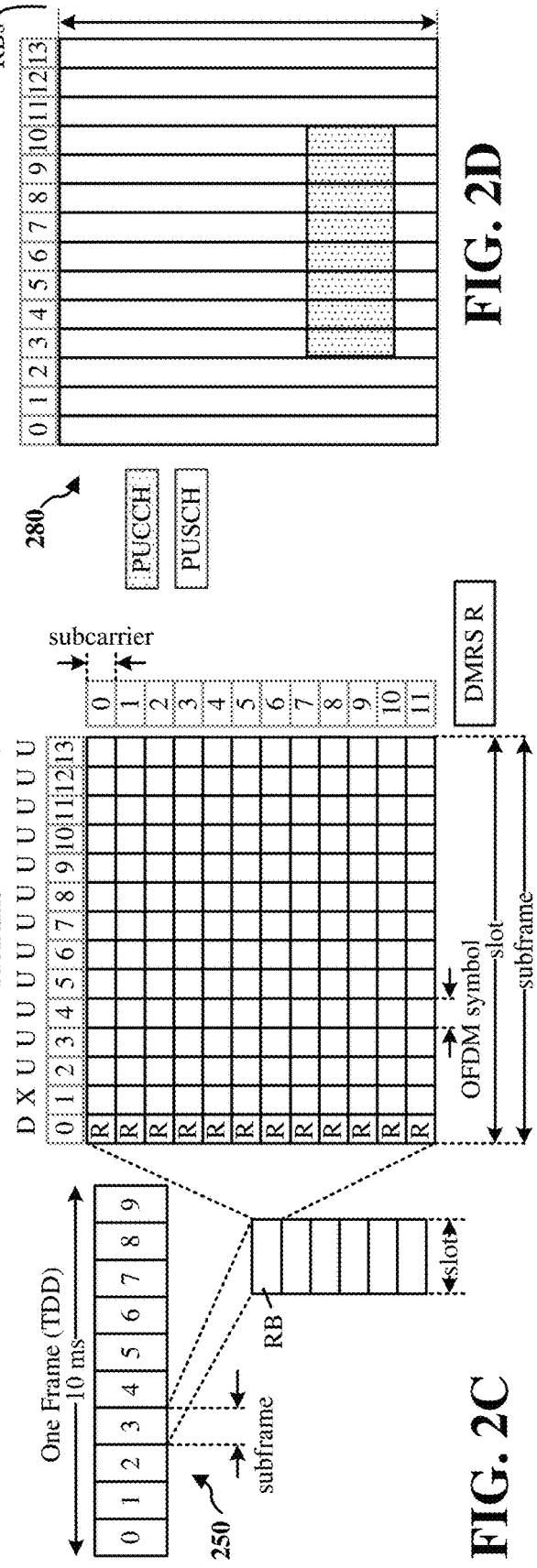
FIG. 2A
FIG. 2B
FIG. 2C
FIG. 2D

BUTLER MATRIX STEERING FOR MULTIPLE ANTENNAS

INTRODUCTION

The present disclosure relates generally to communication systems, and more particularly, to techniques related to beamforming.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects as a prelude to the more detailed description that is presented later.

Aspects of disclosure relate to an apparatus, a method, and a computer-readable medium for beam steering in a multi-antenna wireless communication system using a Butler matrix. In one example, an apparatus for multi-antenna wireless communication is disclosed. The apparatus includes a Butler matrix including input ports and output ports, wherein the Butler matrix is configured to receive at least one activation signal to activate one or more of the input ports and output signals from all of the output ports based on one or more activated input ports, wherein the signals output from the output ports have varying phase shifts relative to each other. The apparatus further includes a plurality of phase shifters respectively coupled to the output ports of the Butler matrix and configured to respectively phase shift the signals output from the output ports, wherein the phase shifted signals have further varying phase shifts relative to each other and a phase difference between adjacent phase shifted signals.

In another example, a method of multi-antenna wireless communication is disclosed. The method includes receiving at least one activation signal to activate one or more input ports of a plurality of input ports of a Butler matrix, outputting signals from all output ports of the Butler matrix based on activation of the one or more input ports, wherein the signals output from the output ports have varying phase shifts relative to each other, and phase shifting, via a plurality of phase shifters respectively coupled to the output ports, the signals output from the output ports, wherein the phase shifted signals have further varying phase shifts relative to each other and a phase difference between adjacent phase shifted signals.

In a further example, an apparatus for multi-antenna wireless communication is disclosed. The apparatus includes means for receiving at least one activation signal to activate one or more input ports of a plurality of input ports of a Butler matrix, means for outputting signals from all output ports of the Butler matrix based on one or more activated input ports, wherein the signals output from the output ports have varying phase shifts relative to each other, and a plurality of phase shifting means respectively coupled to the output ports of the Butler matrix for phase shifting the signals output from the output ports, wherein the phase shifted signals have further varying phase shifts relative to each other and a phase difference between adjacent phase shifted signals.

In another example, a non-transitory computer-readable medium storing code is disclosed. The code includes instructions executable by a processor to receive at least one activation signal to activate one or more input ports of a plurality of input ports of a Butler matrix, output signals from all output ports of the Butler matrix based on one or more activated input ports, wherein the signals output from the output ports have varying phase shifts relative to each other, and phase shift, via a plurality of phase shifters respectively coupled to the output ports, the signals output from the output ports, wherein the phase shifted signals have further varying phase shifts relative to each other and a phase difference between adjacent phase shifted signals.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first radio frame, DL channels within a radio subframe, a second radio frame, and UL channels within a radio subframe, respectively.

DETAILED DESCRIPTION

Figure 1:
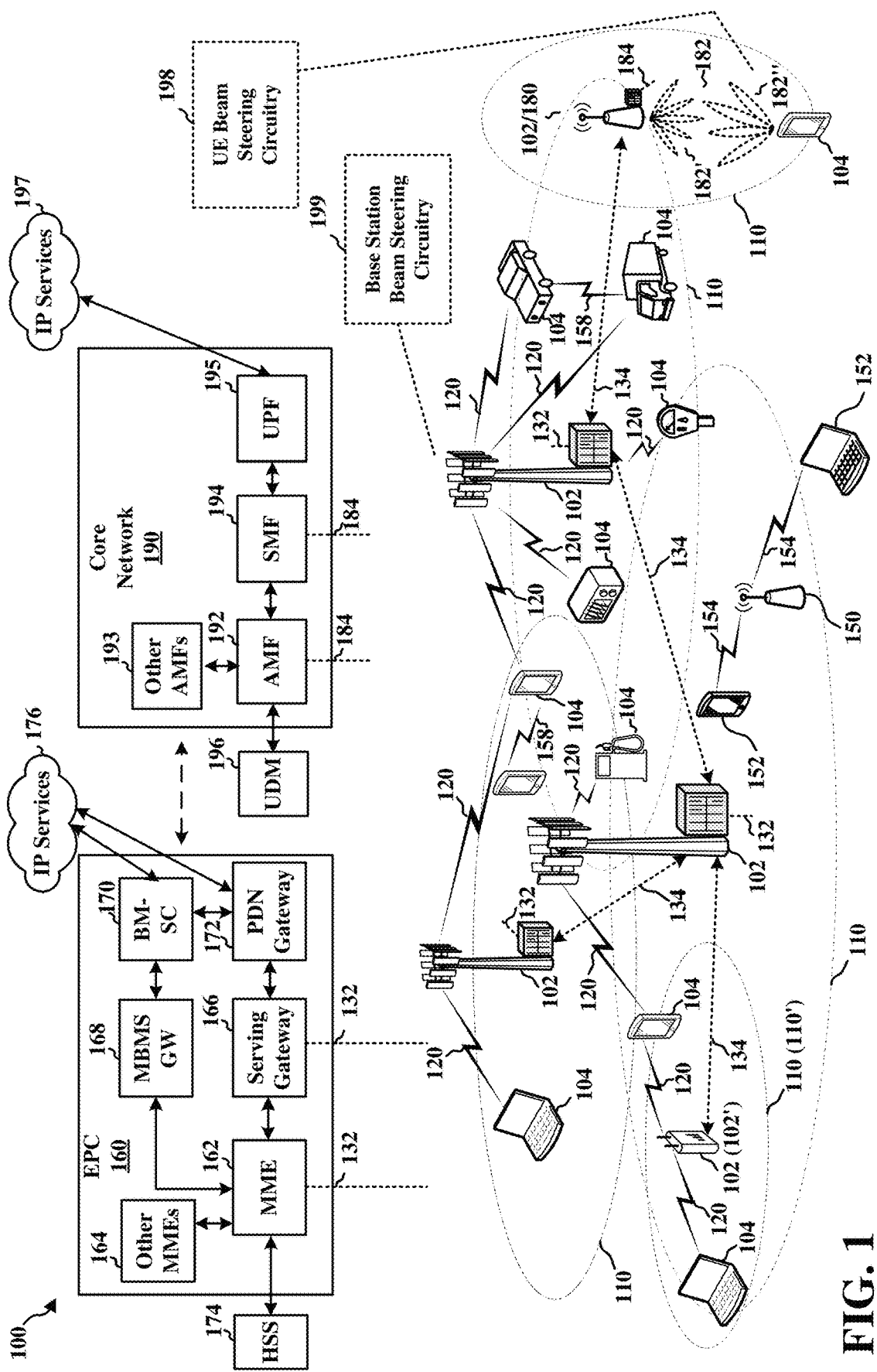
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Aspects of disclosure relate to beam steering at a multi-antenna device (e.g., a user equipment (UE) or a base station). The device receives an activation signal(s) to activate one or more input ports of a plurality of input ports of a Butler matrix and outputs signals from all output ports of the Butler matrix based on activation of the one or more input ports. The signals output from the output ports have varying phase shifts relative to each other. Moreover, the device phase shifts the signals output from the output ports via a plurality of phase shifters respectively coupled to the output ports. The phase shifted signals have further varying phase shifts relative to each other and a phase difference between adjacent phase shifted signals.

In an aspect, each one of the plurality of phase shifters is associated with one antenna element of a plurality of antenna elements of an antenna array. Accordingly, each one of the plurality of antenna elements receives a phase shifted signal from an associated phase shifter and outputs a beam based on the phase shifted signal received from the associated phase shifter. Beams output from the plurality of antenna elements are output with different beam angles relative to each other and have a phase difference between adjacent beams.

In another aspect, a plurality of hybrid couplers are respectively coupled to the plurality of phase shifters. Each hybrid coupler is further coupled to two antenna elements of a plurality of antenna elements. As such, each one of the plurality of hybrid couplers receives a phase shifted signal from a respective phase shifter, and outputs two signals based on the phase shifted signal received from the respective phase shifter. The two signals have a 180° phase shift between each other and are respectively output to the two antenna elements. Furthermore, each one of the plurality of antenna elements receives one of the two signals output from a coupled hybrid coupler, and outputs a beam based on the one of the two signals output from the coupled hybrid coupler. Beams output from the plurality of antenna elements are output with different beam angles relative to each other and have a phase difference between adjacent beams.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC) or a core network of any other wireless communication technology). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The electromagnetic spectrum is often subdivided, based on frequency/wavelength, into various classes, bands, channels, etc. In 5GNR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include UE beam steering circuitry 198. The UE beam steering circuitry 198 may include a Butler matrix including input ports and output ports. The Butler matrix may be configured to receive at least one activation signal to activate one or more of the input ports and output signals from all of the output ports based on one or more activated input ports, wherein the signals output from the output ports have varying phase shifts relative to each other. The UE beam steering circuitry 198 may also include a plurality of phase shifters respectively coupled to the output ports of the Butler matrix. The plurality of phase shifters are configured to respectively phase shift the signals output from the output ports. The phase shifted signals have further varying phase shifts relative to each other and a phase difference between adjacent phase shifted signals. The UE beam steering circuitry 198 may also include an antenna array including a plurality of antenna elements, wherein each one of the plurality of antenna elements is associated with one phase shifter of the plurality of phase shifters. Each one of the plurality of antenna elements is configured to receive a phase shifted signal from an associated phase shifter and output a beam based on the phase shifted signal received from the associated phase shifter. Beams output from the plurality of antenna elements are output with different beam angles relative to each other and have a phase difference between adjacent beams.

Referring again to FIG. 1, in certain aspects, the base station 102 may include base station beam steering circuitry 199. The base station beam steering circuitry 199 may include a Butler matrix including input ports and output ports. The Butler matrix may be configured to receive at least one activation signal to activate one of the input ports and output signals from all of the output ports based on one or more activated input ports, wherein the signals output from the output ports have varying phase shifts relative to each other. The base station beam steering circuitry 199 may also include a plurality of phase shifters respectively coupled to the output ports of the Butler matrix. The plurality of phase shifters are configured to respectively phase shift the signals output from the output ports. The phase shifted signals have further varying phase shifts relative to each other and a phase difference between adjacent phase shifted signals. The base station beam steering circuitry 199 may also include an antenna array including a plurality of antenna elements, wherein each one of the plurality of antenna elements is associated with one phase shifter of the plurality of phase shifters. Each one of the plurality of antenna elements is configured to receive a phase shifted signal from an associated phase shifter and output a beam based on the phase shifted signal received from the associated phase shifter. Beams output from the plurality of antenna elements are output with different beam angles relative to each other and have a phase difference between adjacent beams. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a radio frame structure (e.g., 5G/NR frame structure). FIG. 2B is a diagram 230 illustrating an example of DL channels within a subframe (e.g., 5G/NR subframe). FIG. 2C is a diagram 250 illustrating an example of a second subframe within a radio frame structure (e.g., 5G/NR frame structure). FIG. 2D is a diagram 280 illustrating an example of UL channels within a subframe (e.g., 5G/NR subframe). The radio frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the radio frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a radio frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

In some aspects, in order to provide higher throughput at lower cost, multiple links may be used per panel (e.g., per area of antennas), where each link is separated from the other links by a different plane wave angle of arrival. These aspects may be applicable, for example, in subTHz communication (e.g., 140 GHz or 300 GHz) where the relatively low wavelengths allow for using relatively smaller antennas and relatively smaller distances between antennas, which allows for having more number of antennas and supporting more links with narrower beams and higher spatial separation between the beams, which allows for better spectral efficiency. In one non-limiting aspect, for example, all links associated with a panel may be configured to have orthogonal patterns. In one implementation, such links may be provided using a Butler matrix which is a beamformer circuit configured to feed an antenna array with a uniform distribution and phase difference (e.g., constant phase difference) between adjacent antenna elements.

In an aspect, a Butler matrix may be realized using interconnected phase shifters and hybrid couplers. However, the present aspects are not so limited, and a Butler matrix may be realized in alternative aspects using fewer component types (e.g., using only hybrid couplers) or more component types (e.g., using phase shifters, hybrid couplers, and crossover circuits, etc.). In an aspect, for example, in order to transmit radio-frequency (RF) signals over an antenna array, a modem may select one or more ports of a Butler matrix so that the Butler matrix receives one or more signals on those ports and generates output signals with different phases on opposite ports for transmission over a number of antenna elements coupled with the opposite ports. Also, the Butler matrix may provide reciprocity functionality for receiving RF signals. For example, the Butler matrix may receive RF signals with different phases via multiple ports coupled with a number of antenna elements, and then phase-shift and combine them to provide one or more signals on one or more opposite ports selected by a modem for signal reception. In an aspect, each antenna element of the antenna array may be coupled with one port of the Butler matrix, for example, via one or more low noise amplifiers (LNAs), power amplifiers (PAs), etc., to compensate for insertion loss. The phase shifters in a Butler matrix may be active phase shifters (requiring a connection to a power supply) or passive phase shifters (not requiring a connection to a power supply). In one non-limiting aspect, for example, a phase shifter in a Butler matrix may be realized using a delay line.

In an aspect, a modem and/or another component of a wireless communication device may control a Butler matrix and/or other associated components (e.g., control a gain of an amplifier connecting an output port of the Butler matrix with an antenna element), to form a desired beam for transmitting an RF signal and/or to receive an RF signal over a desired beam. In an aspect, for example, a modem and/or another component of a wireless communication device may control a Butler matrix and/or other associated components to generate multiple signals that are phase-shifted versions of each other, in order to generate a beam by transmission of such signals via multiple antenna elements of an antenna array.

In one non-limiting example aspect, in order to transmit a desired beam, a Butler matrix with a number, N, of input ports and a same number, N, of output ports may allow for feeding an antenna array with a phase difference between adjacent antenna elements in an antenna array with N antenna elements, and each of the N input ports of the Butler matrix may be associated with a different desired beam to be generated by the antenna array. In an aspect, for example, a Butler matrix may be configured to produce a number, N, of orthogonally spaced beams with a plane angle of:

$$\theta_i = \cos^{-1}\left(\frac{\lambda k}{2dN}\right),$$

where $\lambda$ is the wavelength which is equal to the phase speed (magnitude of the phase velocity) of the wave divided by the carrier frequency (e.g., in free space $\lambda=(3\times10^8$ m/s)/carrier frequency), d is the distance between adjacent antennas (which may be, e.g., $\sim=\lambda/2$), and k is:

$$k=-N+1:2:N-1,$$

and such beam configuration is created by adjacent antenna phase difference of:

$$\mp 180 * \frac{2k-1}{N}.$$

In an aspect, for example, $$\frac{N}{2}\log_2 N$$

hybrid couplers and $$\frac{N}{2}(\log_2 N - 1)$$

fixed phase shifters may be used to realize the Butler matrix.

Figure 3:
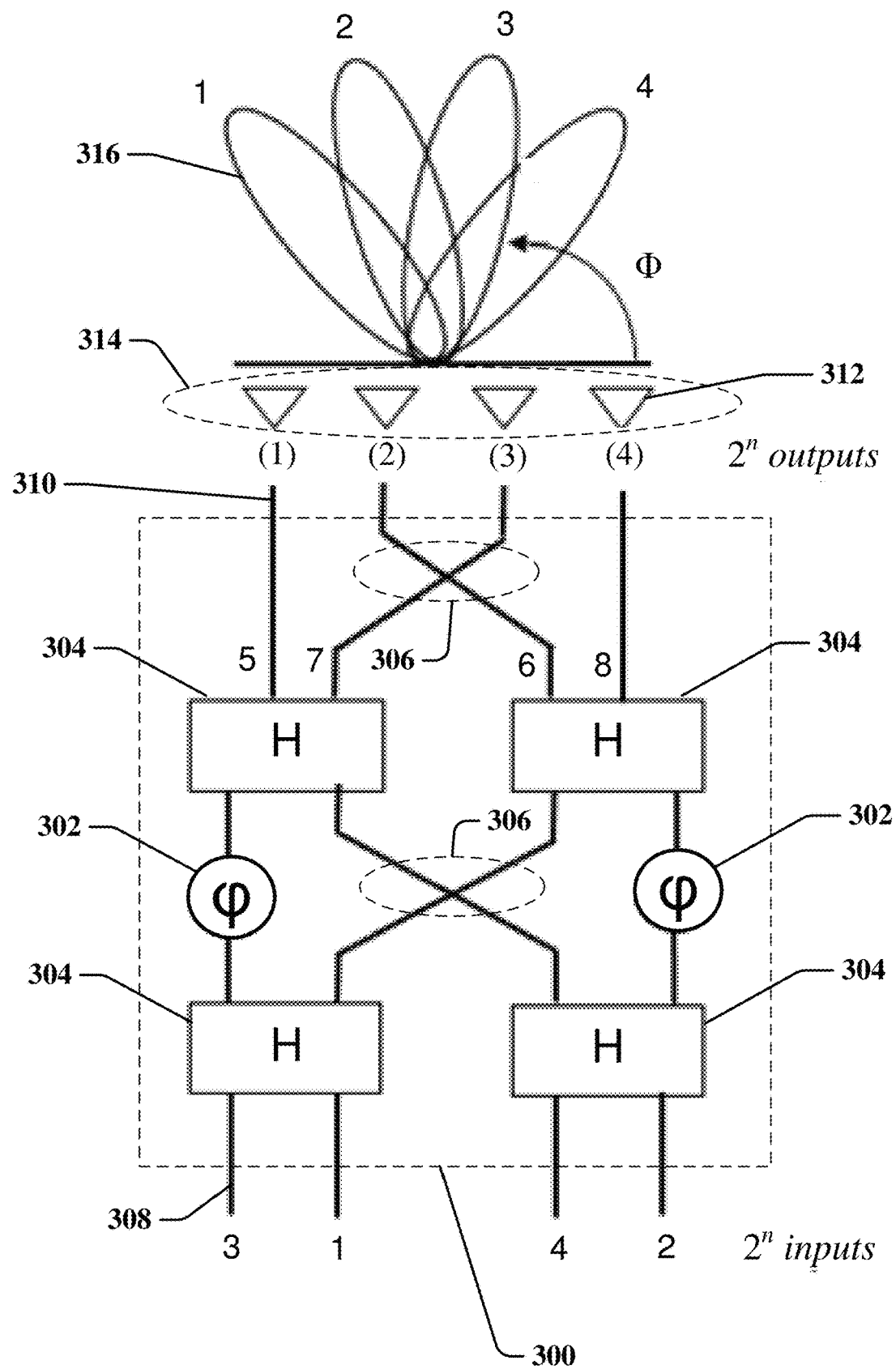
FIG. 3 is a schematic diagram illustrating a first example beamforming circuit in accordance with aspects of the present disclosure.

For example, referring to FIG. 3, in one non-limiting aspect, for transmission of a desired beam 316 via multiple antenna elements 312 of an antenna array 314, a 4×4 Butler matrix 300 may be implemented. The 4×4 Butler matrix 300 is a Butler matrix having four input ports 308 and four output ports 310, where each output port 310 is associated with one antenna element 312 in the antenna array 314. Although some of the present aspects are described herein for transmission of a desired beam using a Butler matrix, the present aspects are not so limited, and each aspect may also be used for reception of the desired beam. For example, although FIG. 3 is described herein for transmission of the desired beam 316 using the 4×4 Butler matrix 300, the present aspects are not so limited, and the 4×4 Butler matrix 300 may also be used for reception of the desired beam 316, in which case the 4×4 Butler matrix 300 receives signals on the output ports 310 and then generates a signal on one or more input ports 308.

The example 4×4 Butler matrix 300 includes two 45° phase shifters 302, four 3 dB 90° hybrid couplers 304, and two crossovers 306. Each 45° phase shifter 302 is a two port circuit that receives a signal on one port and outputs a 45° phase shifted version of that signal on the other port. Each 3 dB 90° hybrid coupler 304 is a circuit having two input ports and two output ports. A 3 dB 90° hybrid coupler 304 splits the power of an input signal received on an input port between two output signals generated on the two output ports, and also causes a 90° phase shift between the two output signals generated on the two output ports. Each crossover 306 is a four port circuit in which one conductor (connecting a first input port to a first output port) crosses over another conductor (connecting a second input port to a second output port) with an air gap in between.

The 45° phase shifters 302, 3 dB 90° hybrid couplers 304, and crossovers 306 are configured and arranged such that an activation of an input port 308 of the 4×4 Butler matrix 300 (via reception of an activation signal) causes an activation of all output ports 310 of the 4×4 Butler matrix 300 but with varying phase shifts relative to each other, such that the interactions of the RF transmissions of the antenna elements 312 fed by the output ports 310 creates a beam 316 corresponding to the activated input port 308. Table 1 provides example phases on each output port 310 of the example 4×4 Butler matrix 300 given an activation of one input port 308 to create a beam 316.

TABLE 1

Example phases on each output port of a 4x4 Butler matrix in response to activation of each input port

| Input port | Output state | | | | b | Beam | $\theta_i$ (d = $\lambda$/2) |
|---|---|---|---|---|---|---|---|
| | Port 5 | Port 6 | Port 7 | Port 8 | | | |
| 1 | 1∠45° | 1∠−180° | 1∠−45° | 1∠90° | +135° | 1 | 138.6° |
| 2 | 1∠0° | 1∠45° | 1∠90° | 1∠135° | +45° | 2 | 104.5° |
| 3 | 1∠135° | 1∠90° | 1∠45° | 1∠0° | −45° | 3 | 75.5° |
| 4 | 1∠90° | 1∠−45° | 1∠−180° | 1∠45° | −135° | 4 | 41.4° |

Accordingly, a Butler matrix may be implemented to provide a passive feeding N×N network (N input ports and N output ports) with beam steering capabilities for uniform rectangular arrays (URAs), where the N output ports of the Butler matrix are connected to respective antenna elements and the N input ports of the Butler matrix represent N orthogonal beam ports. As compared to using N phased arrays for beamforming, a Butler matrix may have lower power consumption, complexity, and/or cost. Further, an N×N Butler matrix may be designed, duplicated, concatenated, etc., to realize a 3D Butler matrix connected to an N×N URA to create N×N beam orthogonal plane waves.

In one non-limiting aspect, for example, a number of Butler matrices each having $2^n$ input ports and $2^n$ output ports may be configured and arranged to realize a 3D Butler matrix connected to a URA having $2^n \times 2^n$ antenna elements to create $2^n \times 2^n$ beam orthogonal plane waves. For example, referring to FIG. 4, in one non-limiting example aspect, a 3D Butler matrix 400 with 16 input ports and 16 output ports may be configured to provide passive feeding for a 4×4 antenna array 402 having 16 antenna elements 403 arranged in four rows where each row includes four antenna elements 403. That is, although the 4×4 antenna elements 403 are schematically illustrated in one row in FIG. 1, the antenna array 402 is 2D and includes a 4×4 matrix of antenna elements 403.

In this non-limiting example aspect, the 3D Butler matrix 400 includes a first layer 2D Butler matrix 404 with 16 input ports and 16 output ports and a second layer 2D Butler matrix 406 with 16 input ports and 16 output ports, where each one of the first layer 2D Butler matrix 404 and the second layer 2D Butler matrix 406 includes four 4×4 Butler matrices 408. In one non-limiting aspect, each of the 4×4 Butler matrices 408 in the first layer 2D Butler matrix 404 or the second layer 2D Butler matrix 406 may be realized similar to the 4×4 Butler matrix 300 described above with reference to FIG. 3, e.g., using phase shifters and hybrid couplers, such that an activation of an input port of each 4×4 Butler matrix 408 activates all output ports of that 4×4 Butler matrix 408.

In an aspect, the output ports of the first layer 2D Butler matrix 404 are connected to the input ports of the second layer 2D Butler matrix 406 such that the four output ports of each 4×4 Butler matrix 408 in the first layer 2D Butler matrix 404 are connected to four input ports of four different 4×4 Butler matrices 408 in the second layer 2D Butler matrix 406. Accordingly, an activation of an output port of the first layer 2D Butler matrix 404 activates one input port in each 4×4 Butler matrix 408 in the second layer 2D Butler matrix 406, thus activating all output ports of the second layer 2D Butler matrix 406. Therefore, an activation of an output port of the first layer 2D Butler matrix 404 activates all output ports of the second layer 2D Butler matrix 406.

Therefore, when an input port of the first layer 2D Butler matrix 404 is activated, all output ports of the second layer 2D Butler matrix 406 are activated, resulting in all antenna elements 403 in the 4×4 antenna array 402 to be activated.

Further, assuming that the 4×4 Butler matrices 408 in the first layer 2D Butler matrix 404 are identical to one another, and that the 4×4 Butler matrices 408 in the second layer 2D Butler matrix 406 are also identical to one another, the output ports of the first layer 2D Butler matrix 404 are connected to the input ports of the second layer 2D Butler matrix 406 such that selection of a 4×4 Butler matrix 408 in the first layer 2D Butler matrix 404 causes selection of a same input port of each of the 4×4 Butler matrices 408 in the second layer 2D Butler matrix 406. For example, in an aspect, selection of the first 4×4 Butler matrix 408 in the first layer 2D Butler matrix 404 causes selection of the first input port of each of the 4×4 Butler matrices 408 in the second layer 2D Butler matrix 406, while selection of the second 4×4 Butler matrix 408 in the first layer 2D Butler matrix 404 causes selection of the second input port of each of the 4×4 Butler matrices 408 in the second layer 2D Butler matrix 406, and so on.

In one non-limiting aspect, different 4×4 Butler matrices 408 in the first layer 2D Butler matrix 404 may be associated with different beam elevations, while different input ports of a 4×4 Butler matrices 408 in the first layer 2D Butler matrix 404 may be associated with different beam azimuths. For example, the four Butler matrices 408 in the first layer 2D Butler matrix 404 may be associated with four different beam elevations, and the four input ports of a 4×4 Butler matrix 408 in the first layer 2D Butler matrix 404 may be associated with four different beam azimuths. For example, in order to achieve a beam with a desired azimuth and a desired elevation, an input port of a Butler matrix 408 in the first layer 2D Butler matrix 404 is activated, where the input port is associated with the desired azimuth, and the Butler matrix 408 is associated with the desired beam elevation.

However, the present aspects are not so limited. For example, in an alternative aspect, different 4×4 Butler matrices 408 in the first layer 2D Butler matrix 404 may be associated with different beam azimuths, while different input ports of a 4×4 Butler matrix 408 in the first layer 2D Butler matrix 404 may be associated with different beam elevations. In this case, in order to achieve a beam with a desired azimuth and a desired elevation, an input port of a Butler matrix 408 in the first layer 2D Butler matrix 404 is activated, where the input port is associated with the desired elevation, and the Butler matrix 408 is associated with the desired beam azimuth.

Figure 4:
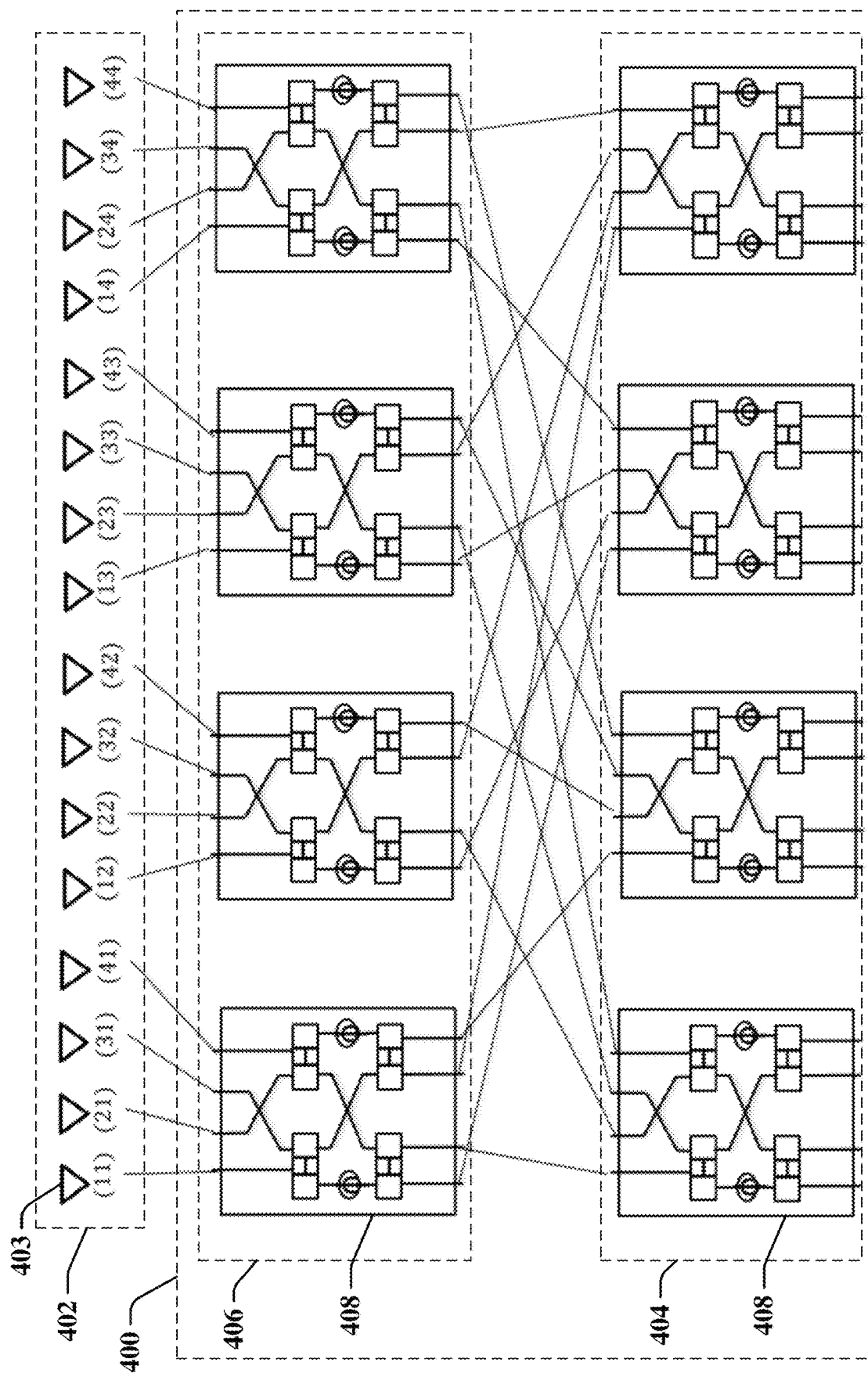
FIG. 4 is a schematic diagram illustrating a second example beamforming circuit in accordance with aspects of the present disclosure.

Although the 4×4 antenna array 402 in FIG. 4 is symmetrical, the present aspects are not so limited. For example, a 3D Butler matrix may be configured to feed an antenna array of size A×B where A is different than B. For example, to feed an A×B antenna array, a 3D Butler matrix may include a second layer 2D Butler matrix that has B number of A×A Butler matrices (B number of Butler matrices each having A input ports and A output ports).

In an aspect, Butler matrix beam steering may be utilized for enhanced spherical coverage and supporting movement of beam angle of arrival. For example, phase shifters (active or passive) may be added to outputs of the Butler matrix to enable common beam steering for improved spherical coverage (which enhances throughput) and improved beam tracking (which enhances link stability).

In an aspect, when the phase shifters are added to the Butler matrix outputs (and prior to the antennas), the phase shifters may create an identical phase difference between adjacent antennas. This creates a common beam steering for all beam directions. In other aspects, the phase shifters may create a non-identical phase difference between adjacent antennas. In general, the non-identical phase difference between the adjacent antennas may distort a shape, width, and/or angle of the beams. For each beam, the phase difference creates a different beam angle. In small phase differences, the beams stay close to orthogonal. Notably, the added phase shifters are to maintain good reciprocity in order for a system to work for uplink communication and downlink communication.

In some examples, the added phase shifters may be active phase shifters such as Cartesian phase shifters, Varactor phase shifters, Micro-Electro-Mechanical Systems (MEMS), Ferrite phase shifters, or other phase shifters to compensate for the high insertion loss of the Butler matrix. In other examples, the added phase shifters may be passive phase shifters such as delay lines, switched delay lines, high-pass low pass filters, Schiffman phase shifters, reflective type phase shifters, loaded lines, etc. Use of the passive phase shifters can reduce complexity, power, and cost.

In an aspect, the added phase shifters may have a phase difference (e.g., in a use case utilizing two panels, each panel having a different phase difference) or several bits (e.g., for tunable Butler steering).

In an aspect, the added phase shifters can also be used for a uniform rectangular array (URA). In such an implementation, the Butler matrix is 3D with $N^2$ inputs, outputs, and phase shifters.

Figure 5:
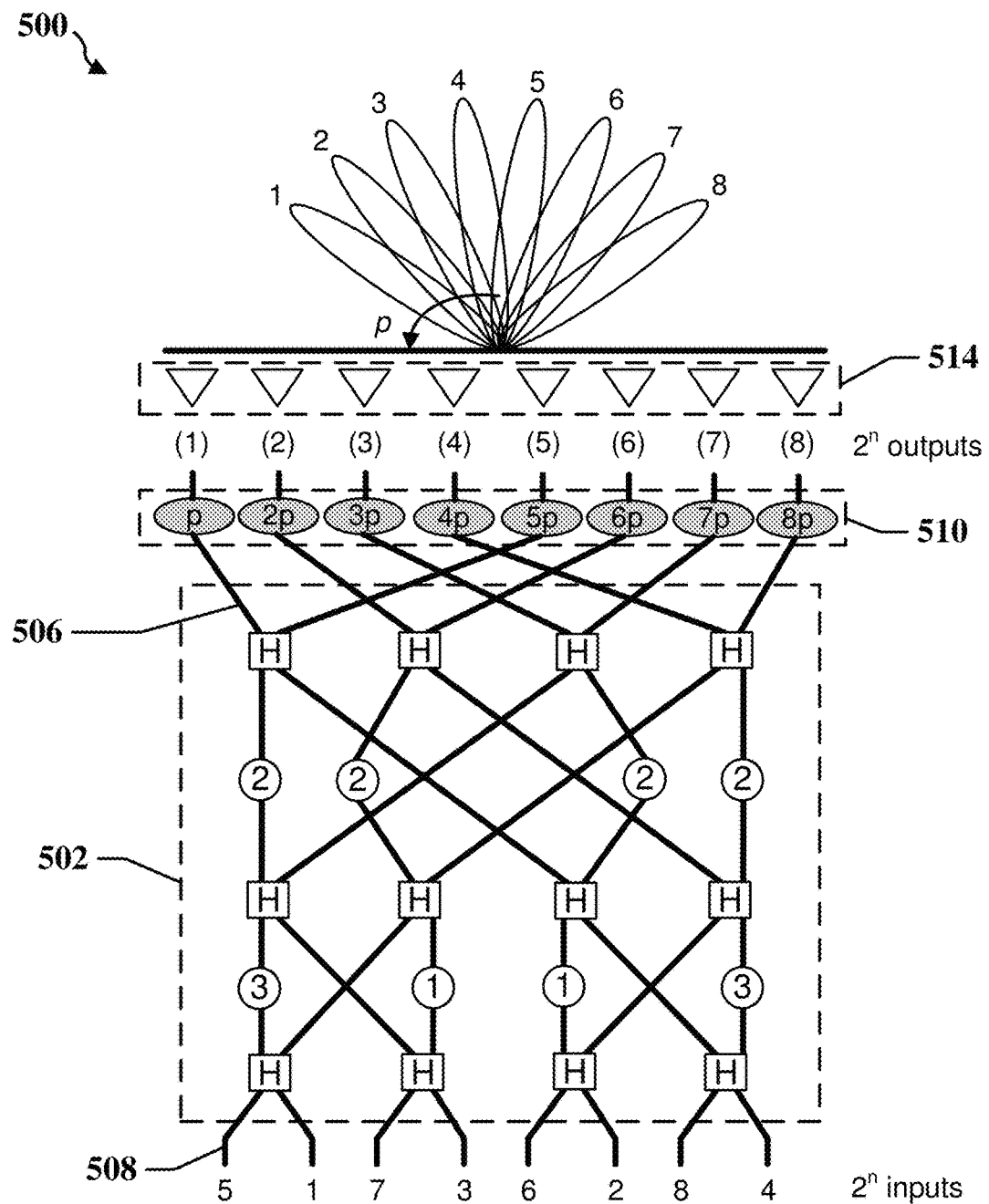
FIG. 5 illustrates an example multi-antenna design utilizing an 8×8 Butler matrix in accordance with aspects of the present disclosure.

FIG. 5 illustrates an example multi-antenna design 500 utilizing an 8×8 Butler matrix 502. The 8×8 Butler matrix 502 includes twelve 90° hybrid couplers and eight phase shifters. Each input is numbered with a same number that marks a transmission angle.

In an aspect, an ideal $S_{21}$ matrix of the 8×8 Butler matrix 502, where columns represent different inputs and rows represent different antennas, may be as follows:

$S_{21}$ Matrix of 8 × 8 Butler Matrix $$[S_r] = \frac{1}{2\sqrt{2}} \times$$

$$\begin{bmatrix}
e^{-j5\frac{\pi}{8}} & e^{-j9\frac{\pi}{8}} & e^{-j6\frac{\pi}{8}} & e^{-j10\frac{\pi}{8}} & e^{-j5\frac{\pi}{8}} & e^{-j9\frac{\pi}{8}} & e^{-j8\frac{\pi}{8}} & e^{-j12\frac{\pi}{8}} \\
e^{-j6\frac{\pi}{8}} & e^{-j2\frac{\pi}{8}} & e^{-j11\frac{\pi}{8}} & e^{-j7\frac{\pi}{8}} & e^{-j8\frac{\pi}{8}} & e^{-j4\frac{\pi}{8}} & e^{-j15\frac{\pi}{8}} & e^{-j11\frac{\pi}{8}} \\
e^{-j7\frac{\pi}{8}} & e^{-j11\frac{\pi}{8}} & e^{-j0\frac{\pi}{8}} & e^{-j4\frac{\pi}{8}} & e^{-j11\frac{\pi}{8}} & e^{-j15\frac{\pi}{8}} & e^{-j6\frac{\pi}{8}} & e^{-j10\frac{\pi}{8}} \\
e^{-j8\frac{\pi}{8}} & e^{-j4\frac{\pi}{8}} & e^{-j5\frac{\pi}{8}} & e^{-j\frac{\pi}{8}} & e^{-j14\frac{\pi}{8}} & e^{-j10\frac{\pi}{8}} & e^{-j13\frac{\pi}{8}} & e^{-j9\frac{\pi}{8}} \\
e^{-j9\frac{\pi}{8}} & e^{-j13\frac{\pi}{8}} & e^{-j10\frac{\pi}{8}} & e^{-j14\frac{\pi}{8}} & e^{-j\frac{\pi}{8}} & e^{-j5\frac{\pi}{8}} & e^{-j4\frac{\pi}{8}} & e^{-j8\frac{\pi}{8}} \\
e^{-j10\frac{\pi}{8}} & e^{-j6\frac{\pi}{8}} & e^{-j15\frac{\pi}{8}} & e^{-j11\frac{\pi}{8}} & e^{-j4\frac{\pi}{8}} & e^{-j0\frac{\pi}{8}} & e^{-j11\frac{\pi}{8}} & e^{-j7\frac{\pi}{8}} \\
e^{-j11\frac{\pi}{8}} & e^{-j15\frac{\pi}{8}} & e^{-j4\frac{\pi}{8}} & e^{-j8\frac{\pi}{8}} & e^{-j7\frac{\pi}{8}} & e^{-j11\frac{\pi}{8}} & e^{-j2\frac{\pi}{8}} & e^{-j6\frac{\pi}{8}} \\
e^{-j12\frac{\pi}{8}} & e^{-j8\frac{\pi}{8}} & e^{-j9\frac{\pi}{8}} & e^{-j5\frac{\pi}{8}} & e^{-j10\frac{\pi}{8}} & e^{-j6\frac{\pi}{8}} & e^{-j9\frac{\pi}{8}} & e^{-j5\frac{\pi}{8}}
\end{bmatrix}$$

As shown in FIG. 5, eight added phase shifters 510 may be appended to eight outputs 506 of the 8×8 Butler matrix 502. A phase difference between adjacent antennas 514 is p, where p is identical for all inputs (columns in $S_{21}$-matrix) and increases in each row of the $S_{21}$ matrix. In some aspects, the phase difference between adjacent antennas 514 may be non-identical.

Figure 6:
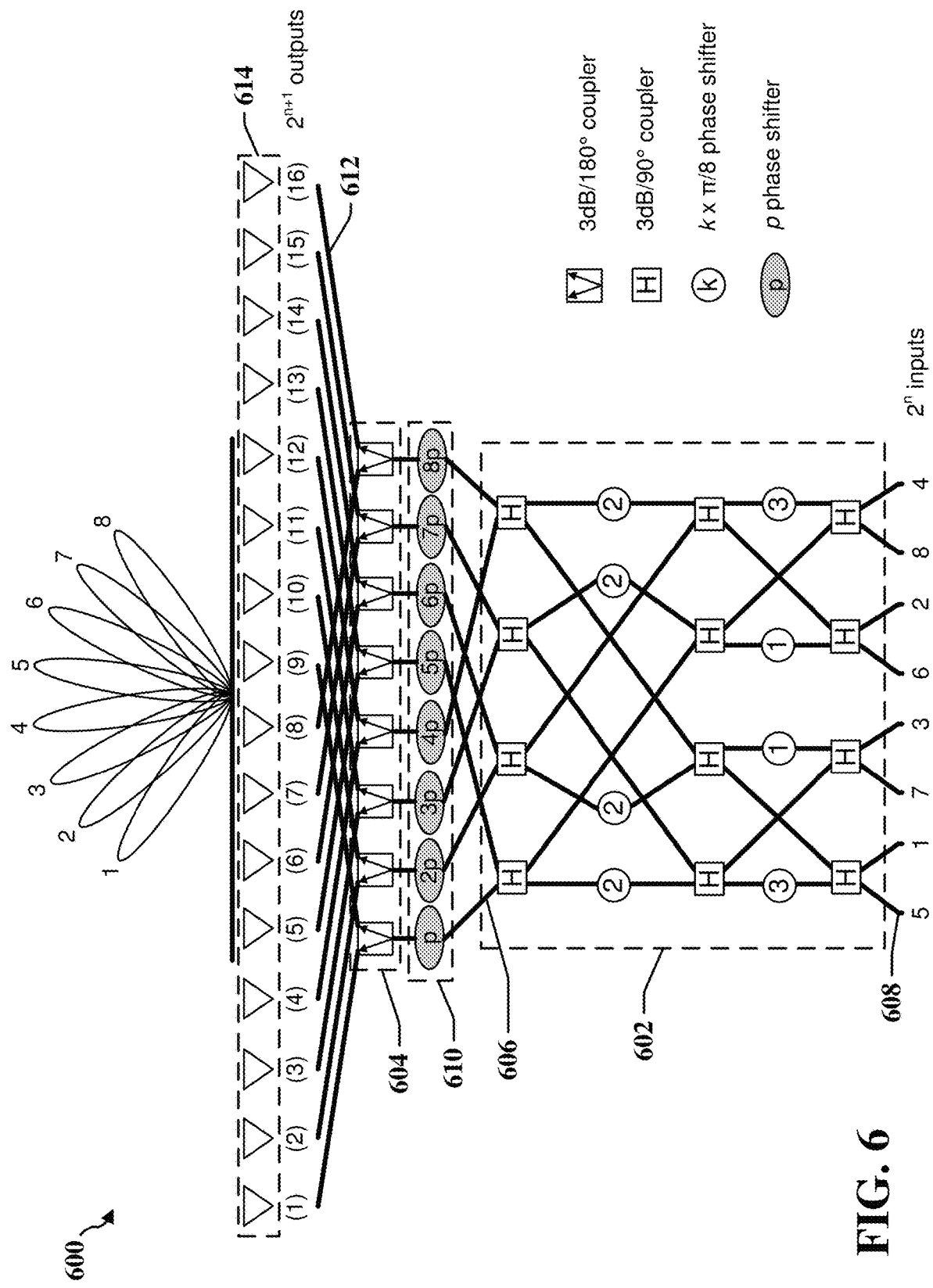
FIG. 6 illustrates an example multi-antenna design utilizing an 8×16 Butler matrix in accordance with aspects of the present disclosure.

FIG. 6 illustrates an example multi-antenna design 600 utilizing an 8×16 Butler matrix. The 8×16 Butler matrix includes an 8×8 Butler matrix 602 outputting eight initial outputs 606 coupled to eight 180° hybrid couplers 604. With this design, the 8×8 Butler matrix 602 may be expanded to 16 outputs 612 feeding 16 antennas 614 to ensure higher beam separation and increased array gain.

As shown in FIG. 6, eight added phase shifters 610 may be appended to eight outputs 606 of the 8×8 Butler matrix 602 (before the eight 180° hybrid couplers 604). This may be applicable if p=(180−2 πk)/N, where p is a phase difference or additional phase, N is the number of inputs, and k is an integer. Otherwise, 16 added phase shifters may be appended after the eight 180° hybrid couplers 604 and before the 16 antennas 614. The added phase shifters (whether 8 or 16) facilitates the ability of small angle beam steering (for spherical coverage).

In an aspect, the equation p=(180−2 πk)/N may be derived as follows. For example, given the number of inputs N=8, the number of antennas in an antenna array is 16, and a desire for a phase difference (e.g., constant phase difference) between adjacent phase shifted signals, then left-side antennas of the antenna array may have additional phases of p, 2p, 3p, 4p, 5p, 6p, 7p, and 8p and right-side antennas of the antenna array may have additional phases of p+180, 2p+180, 3p+180, 4p+180, 5p+180, 6p+180, 7p+180, and 8p+180. Accordingly, a right-most antenna of the left-side antennas (left array) is to have a phase difference of p=+2π with a left-most antenna of the right-side antennas (right array). This means that p+180 (right array)−Np (left array)=p+2 πk (where k is an integer and N=8 in the example). Thus, Np=180−2 πk, which yields the equation p=(180−2 πk)/N. Notably, the values used in the derivation of the equation p=(180−2 πk)/N are merely examples and it is contemplated that other values may be used such as to reduce complexity and/or design a multi-antenna system with small phase error.

Figure 7:
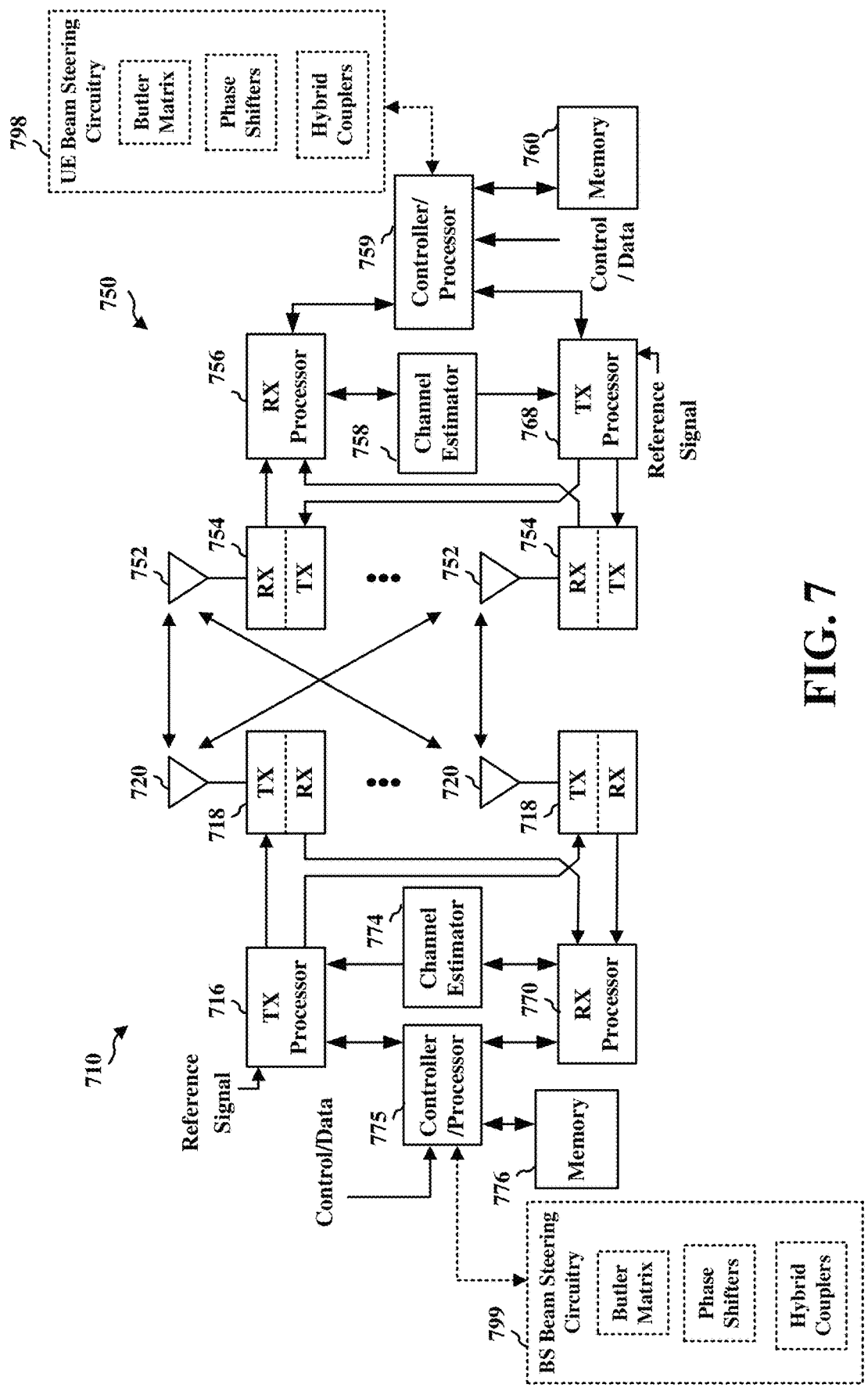
FIG. 7 is a block diagram of a base station in communication with a UE in an access network in accordance with aspects of the present disclosure.

FIG. 7 is a block diagram of a base station 710 in communication with a UE 750 in an access network. In the DL, IP packets from the EPC 160 may be provided to a controller/processor 775. The controller/processor 775 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 775 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 716 and the receive (RX) processor 770 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 716 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 774 may be used to determine the coding and modulation scheme, as well as for spatial processing. The channel estimate may be derived from a reference signal and/or channel condition feedback transmitted by the UE 750. Each spatial stream may then be provided to a different antenna 720 via a separate transmitter 718TX. Each transmitter 718TX may modulate an RF carrier with a respective spatial stream for transmission.

At the UE 750, each receiver 754RX receives a signal through its respective antenna 752. Each receiver 754RX recovers information modulated onto an RF carrier and provides the information to the receive (RX) processor 756. The TX processor 768 and the RX processor 756 implement layer 1 functionality associated with various signal processing functions. The RX processor 756 may perform spatial processing on the information to recover any spatial streams destined for the UE 750. If multiple spatial streams are destined for the UE 750, they may be combined by the RX processor 756 into a single OFDM symbol stream. The RX processor 756 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 710. These soft decisions may be based on channel estimates computed by the channel estimator 758. The soft decisions are then decoded and deinterleaved to recover the data and control signals that were originally transmitted by the base station 710 on the physical channel. The data and control signals are then provided to the controller/processor 759, which implements layer 3 and layer 2 functionality.

The controller/processor 759 can be associated with a memory 760 that stores program codes and data. The memory 760 may be referred to as a computer-readable medium. In the UL, the controller/processor 759 provides demultiplexing between transport and logical channels, packet reassembly, deciphering, header decompression, and control signal processing to recover IP packets from the EPC 160. The controller/processor 759 is also responsible for error detection using an ACK and/or NACK protocol to support HARQ operations.

Similar to the functionality described in connection with the DL transmission by the base station 710, the controller/processor 759 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 758 from a reference signal or feedback transmitted by the base station 710 may be used by the TX processor 768 to select the appropriate coding and modulation schemes, and to facilitate spatial processing. The spatial streams generated by the TX processor 768 may be provided to different antenna 752 via separate transmitters 754TX. Each transmitter 754TX may modulate an RF carrier with a respective spatial stream for transmission.

The UL transmission is processed at the base station 710 in a manner similar to that described in connection with the receiver function at the UE 750. Each receiver 718RX receives a signal through its respective antenna 720. Each receiver 718RX recovers information modulated onto an RF carrier and provides the information to a RX processor 770.

The controller/processor 775 can be associated with a memory 776 that stores program codes and data. The memory 776 may be referred to as a computer-readable medium. In the UL, the controller/processor 775 provides demultiplexing between transport and logical channels, packet reassembly, deciphering, header decompression, control signal processing to recover IP packets from the UE 750.

IP packets from the controller/processor 775 may be provided to the EPC 160. The controller/processor 775 is also responsible for error detection using an ACK and/or NACK protocol to support HARQ operations.

At least one of the TX processor 768, the RX processor 756, and the controller/processor 759 may be configured to perform aspects in connection with the UE beam steering circuitry 198 of FIG. 1. For example, the UE 750 may include UE beam steering circuitry 798 (e.g., including a Butler matrix, phase shifters, hybrid couplers, and/or other circuitry) configured to perform the operations described above with respect to the UE beam steering circuitry 198 of FIG. 1.

At least one of the TX processor 716, the RX processor 770, and the controller/processor 775 may be configured to perform aspects in connection with the BS beam steering circuitry 199 of FIG. 1. For example, the BS 710 may include BS beam steering circuitry 799 (e.g., including a Butler matrix, phase shifters, hybrid couplers, and/or other circuitry) configured to perform the operations described above with respect to the BS beam steering circuitry 199 of FIG. 1.

Figure 8:
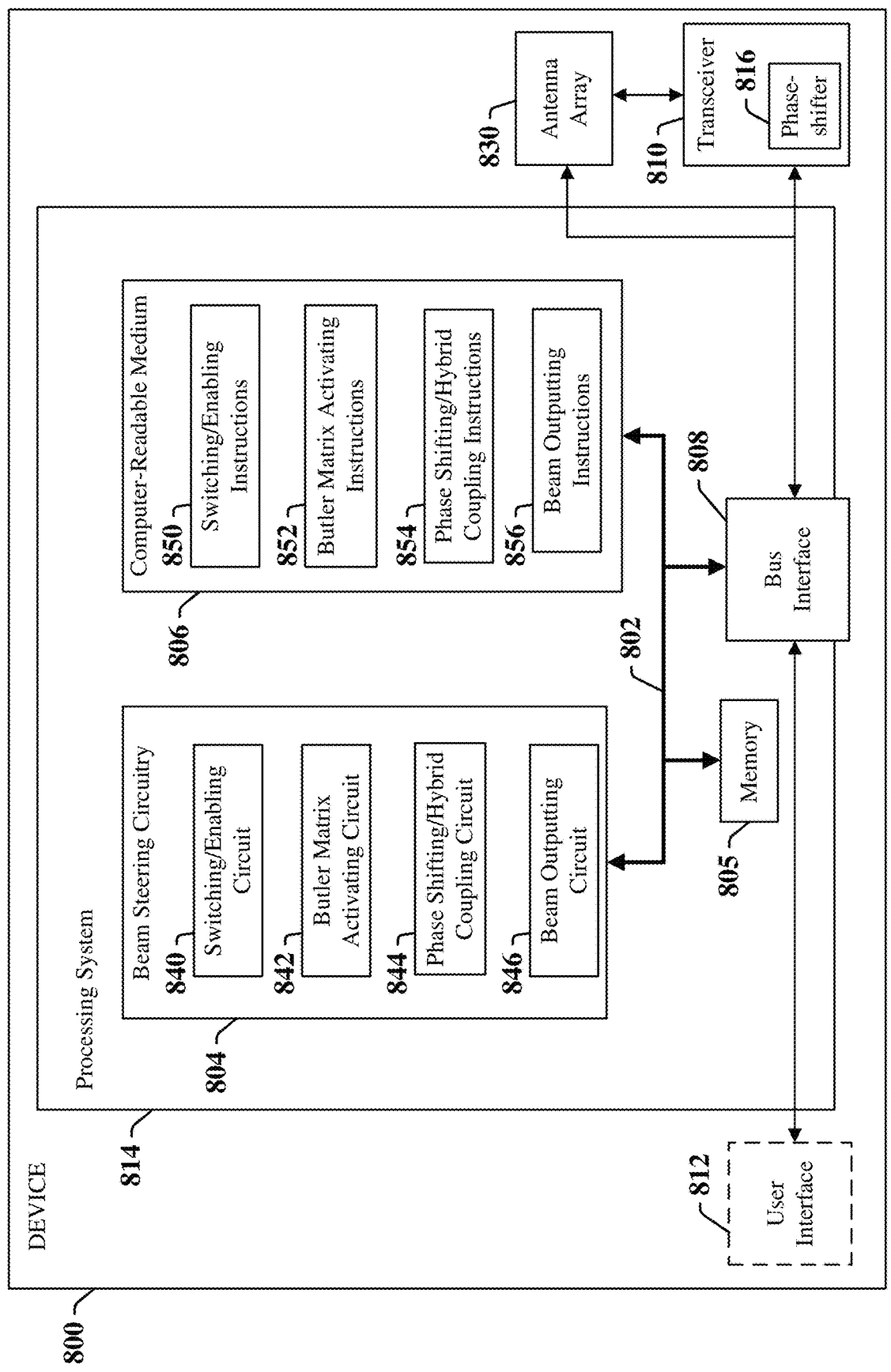
FIG. 8 is a block diagram illustrating an example of a hardware implementation for an exemplary device 800 employing a processing system in accordance with aspects of the present disclosure.

FIG. 8 is a block diagram illustrating an example of a hardware implementation for an exemplary device 800 employing a processing system 814. For example, the device 800 may be a UE or a base station, as illustrated in any one or more of FIG. 1, 7, 11, or 12. The device 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the device 800 may be configured to perform any one or more of the functions described herein. That is, the processor 804, as utilized in a device 800, may include the UE beam steering circuitry 198/798 or BS beam steering circuitry 199/799 and used to implement any one or more of the processes and procedures described below and illustrated in FIGS. 9 and 10.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a communication interface or means for communicating with various other apparatus over a transmission medium. In some examples, the transceiver 810 may include a phase-shifter 816 for digital and/or analog beamforming via one or more antenna array(s) 830. Depending upon the nature of the apparatus, a user interface 812 (e.g., keypad, display, speaker, microphone, joystick) may also be provided. Of course, such a user interface 812 is optional, and may be omitted in some examples, such as a base station.

In some aspects of the disclosure, the processor 804 (e.g., UE beam steering circuitry 198/798 or BS beam steering circuitry 199/799) may include switching/enabling circuitry 840 configured for various functions, including, for example, associating a plurality of antenna elements of an antenna array with output ports of a Butler matrix, wherein the switching/enabling circuitry 840 is configurable into a reception mode for signal reception by the antenna array and configurable into a transmission mode for signal transmission by the antenna array. The switching/enabling circuitry 840 may also be configured for enabling a plurality of phase shifters to respectively phase shift signals output from the output ports and/or disabling the plurality of phase shifters from respectively phase shifting the signals output from the output ports. For example, the switching/enabling circuitry 840 may be configured to implement one or more of the functions described below in relation to FIG. 9, including, e.g., blocks 902 and 904, and in relation to FIG. 10, e.g., blocks 1002 and 1004. The processor 804 may also include Butler matrix activating circuitry 842 configured for various functions, including, for example, receiving at least one activation signal to activate one or more input ports of a plurality of input ports of a Butler matrix and outputting signals from all output ports of the Butler matrix based on activation of the one or more input ports, wherein the signals output from the output ports have varying phase shifts relative to each other. For example, the Butler matrix activating circuitry 842 may be configured to implement one or more of the functions described below in relation to FIG. 9, including, e.g., blocks 906 and 908, and in relation to FIG. 10, including, e.g., blocks 1006 and 1008. The processor 804 may also include phase shifting/hybrid coupling circuitry 844 configured for various functions, including, for example, phase shifting, via a plurality of phase shifters respectively coupled to the output ports, the signals output from the output ports, wherein the phase shifted signals have further varying phase shifts relative to each other and a phase difference (e.g., constant phase difference) between adjacent phase shifted signals. The phase shifting/hybrid coupling circuitry 844 may also be configured for receiving, at each one of a plurality of hybrid couplers respectively coupled to the plurality of phase shifters, a phase shifted signal from a respective phase shifter and outputting, from each one of the plurality of hybrid couplers, two signals based on the phase shifted signal received from the respective phase shifter, wherein the two signals have a 180° phase shift between each other and are respectively output to two antenna elements of a plurality of antenna elements coupled to a respective one of the plurality of hybrid couplers. For example, the phase shifting/hybrid coupling circuitry 844 may be configured to implement one or more of the functions described below in relation to FIG. 9, including, e.g., block 910, and in relation to FIG. 10, including, e.g., blocks 1010, 1012, and 1014. The processor 804 may also include beam outputting circuitry 846 configured for various functions, including, for example, receiving at each one of the plurality of antenna elements, a phase shifted signal from an associated phase shifter and outputting, from each one of the plurality of antenna elements, a beam based on the phase shifted signal received from the associated phase shifter, wherein beams output from the plurality of antenna elements are output with different beam angles relative to each other and have a phase difference (e.g., constant phase difference) between adjacent beams. The beam outputting circuitry 846 may also be configured for receiving, at each one of the plurality of antenna elements, one of the two signals output from the respective one of the plurality of hybrid couplers and outputting, from each one of the plurality of antenna elements, a beam based on the one of the two signals output from the respective one of the plurality of hybrid couplers, wherein beams output from the plurality of antenna elements are output with different beam angles relative to each other and have a phase difference (e.g., constant/identical phase difference) between adjacent beams. For example, the beam outputting circuitry 846 may be configured to implement one or more of the functions described below in relation to FIG. 9, including, e.g., blocks 912 and 914, and in relation to FIG. 10 including, e.g., blocks 1016 and 1018.

The processor 804 is responsible for managing the bus 802 and general processing, including the execution of software stored on the computer-readable medium 806. The software, when executed by the processor 804, causes the processing system 814 to perform the various functions described below for any particular apparatus. The computer-readable medium 806 and the memory 805 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806. The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 806 may include switching/enabling instructions 850 configured for various functions, including, for example, associating a plurality of antenna elements of an antenna array with output ports of a Butler matrix, wherein the switching/enabling instructions 850 is configurable into a reception mode for signal reception by the antenna array and configurable into a transmission mode for signal transmission by the antenna array. The switching/enabling instructions 850 may also be configured for enabling a plurality of phase shifters to respectively phase shift signals output from the output ports and/or disabling the plurality of phase shifters from respectively phase shifting the signals output from the output ports. For example, the switching/enabling instructions 850 may be configured to implement one or more of the functions described below in relation to FIG. 9, including, e.g., blocks 902 and 904, and in relation to FIG. 10, e.g., blocks 1002 and 1004. The computer-readable storage medium 806 may also include Butler matrix activating instructions 852 configured for various functions, including, for example, receiving at least one activation signal to activate one or more input ports of a plurality of input ports of a Butler matrix and outputting signals from all output ports of the Butler matrix based on activation of the one or more input ports, wherein the signals output from the output ports have varying phase shifts relative to each other. For example, the Butler matrix activating instructions 852 may be configured to implement one or more of the functions described below in relation to FIG. 9, including, e.g., blocks 906 and 908, and in relation to FIG. 10, including, e.g., blocks 1006 and 1008. The computer-readable storage medium 806 may also include phase shifting/hybrid coupling instructions 854 configured for various functions, including, for example, phase shifting, via a plurality of phase shifters respectively coupled to the output ports, the signals output from the output ports, wherein the phase shifted signals have further varying phase shifts relative to each other and a phase difference (e.g., constant phase difference) between adjacent phase shifted signals. The phase shifting/hybrid coupling instructions 854 may also be configured for receiving, at each one of a plurality of hybrid couplers respectively coupled to the plurality of phase shifters, a phase shifted signal from a respective phase shifter and outputting, from each of the plurality of hybrid couplers, two signals based on the phase shifted signal received from the respective phase shifter, wherein the two signals have a 180° phase shift between each other and are respectively output to two antenna elements of a plurality of antenna elements coupled to a respective one of the plurality of hybrid couplers. For example, the phase shifting/hybrid coupling instructions 854 may be configured to implement one or more of the functions described below in relation to FIG. 9, including, e.g., block 910, and in relation to FIG. 10, including, e.g., blocks 1010, 1012, and 1014. The computer-readable storage medium 806 may also include beam outputting instructions 856 configured for various functions, including, for example, receiving at each one of the plurality of antenna elements, a phase shifted signal from an associated phase shifter and outputting, from each one of the plurality of antenna elements, a beam based on the phase shifted signal received from the associated phase shifter, wherein beams output from the plurality of antenna elements are output with different beam angles relative to each other and have a phase difference (e.g., constant phase difference) between adjacent beams. The beam outputting instructions 856 may also be configured for receiving, at each one of the plurality of antenna elements, one of the two signals output from the respective one of the plurality of hybrid couplers and outputting, from each one of the plurality of hybrid couplers, a beam based on the one of the two signals output from the respective one of the plurality of hybrid couplers, wherein beams output from the plurality of antenna elements are output with different beam angles relative to each other and have a phase difference (e.g., constant phase difference) between adjacent beams. For example, the beam outputting instructions 856 may be configured to implement one or more of the functions described below in relation to FIG. 9, including, e.g., blocks 912 and 914, and in relation to FIG. 10 including, e.g., blocks 1016 and 1018.

Figure 9:
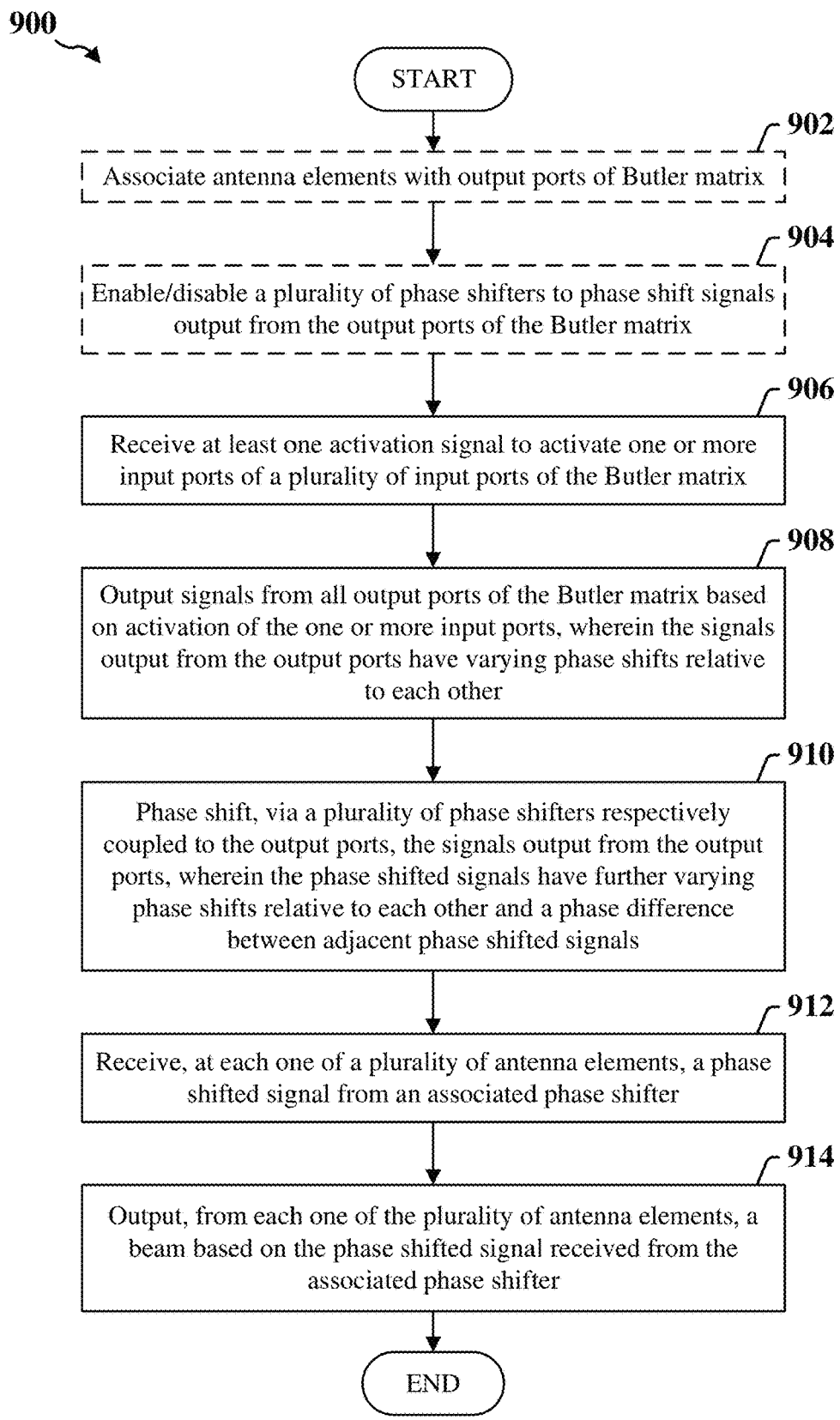
FIG. 9 is a flow chart illustrating an exemplary process for multi-antenna wireless communication in accordance with aspects of the present disclosure.

FIG. 9 is a flow chart illustrating an exemplary process 900 for multi-antenna wireless communication in accordance with aspects of the present disclosure. As described below, some or all illustrated features may be omitted in a particular implementation within the scope of the present disclosure, and some illustrated features may not be required for implementation of all aspects. In some examples, the process 900 may be carried out by the device 800 illustrated in FIG. 8, which may be a UE or a base station, as illustrated in any one or more of FIG. 1, 7, 11, or 12. In some examples, the process 900 may be carried out by any suitable apparatus or means for carrying out the functions or algorithm described below.

At block 902, the device may associate, via a switching/enabling circuit (e.g., switching/enabling circuitry 840 and/or switches 1192/1292), a plurality of antenna elements (e.g., antennas 514) of an antenna array with output ports (e.g., output ports 506) of a Butler matrix (e.g., Butler matrix 502). The switching circuit configures the device into a reception mode for signal reception by the antenna array and into a transmission mode for signal transmission by the antenna array. At block 904, the device may also enable, via the switching/enabling circuit, a plurality of phase shifters (e.g., phase shifters 510) to respectively phase shift the signals output from the output ports. The device may further disable (via the switching/enabling circuit) the plurality of phase shifters from respectively phase shifting the signals output from the output ports if desired.

At block 906, the device may receive at least one activation signal to activate one or more input ports (e.g., input ports 508) of a plurality of input ports of the Butler matrix. In an aspect, receiving the at least one activation signal activates different input ports.

At block 908, the device may output signals from all output ports of the Butler matrix based on activation of the one or more input ports. The signals output from the output ports have varying phase shifts relative to each other. In an aspect, outputting the signals from all output ports includes outputting the signals in a different phase pattern based on the activation of the different input ports. In another aspect, the signals output from the output ports have a uniform phase distribution and a phase difference (e.g., constant phase difference) between adjacent signals.

At block 910, the device may phase shift, via the plurality of phase shifters (e.g., phase shifters 510) respectively coupled to the output ports, the signals output from the output ports. The phase shifted signals have further varying phase shifts relative to each other and a phase difference (e.g., constant phase difference) between adjacent phase shifted signals.

In an aspect, each one of the plurality of phase shifters is associated with one antenna element of the plurality of antenna elements of the antenna array. Accordingly, at block 912, the device may receive, at each one of the plurality of antenna elements respectively associated with the plurality of phase shifters, a phase shifted signal from an associated phase shifter. Moreover, at block 914, and the device may output, from each one of the plurality of antenna elements, a beam based on the phase shifted signal received from the associated phase shifter. Beams output from the plurality of antenna elements are output with different beam angles relative to each other and have a phase difference (e.g., constant phase difference) between adjacent beams. In an aspect, a quantity of the plurality of antenna elements (e.g., 8 antenna elements) is equal to a quantity of the plurality of phase shifters (e.g., 8 phase shifters).

In one configuration, the device 800 for wireless communication includes means for associating (e.g., switching/enabling circuitry 840 and/or switches 1192/1292) a plurality of antenna element means for outputting a beam (e.g., antennas 514, antenna array 830, or antenna array 144) with output ports of a Butler matrix, means for enabling/means for disabling (e.g., switching/enabling circuitry 840 and/or switches 1192/1292) a plurality of phase shifting means to respectively phase shift signals output from the output ports, means for receiving at least one activation signal (e.g., Butler matrix 502 and/or Butler matrix activating circuit 842) to activate one or more input ports of a plurality of input ports of a Butler matrix, means for outputting (e.g., Butler matrix 502 and/or Butler matrix activating circuit 842) signals from all output ports of the Butler matrix based on one or more activated input ports, wherein the signals output from the output ports have varying phase shifts relative to each other, a plurality of phase shifting means respectively coupled to the output ports of the Butler matrix (e.g., phase shifters 510, phase shifting/hybrid coupling circuitry 844, and/or phase shifter 816) for respectively phase shifting the signals output from the output ports, wherein the phase shifted signals have further varying phase shifts relative to each other and a phase difference (e.g., constant phase difference) between adjacent phase shifted signals, means for receiving (e.g., antennas 514, antenna array 830, antenna array 144, and/or beam outputting circuitry 846), at each one of the plurality of antenna element means, a phase shifted signal from an associated phase shifting means, and means for outputting (e.g., antennas 514, antenna array 830, antenna array 144, and/or beam outputting circuitry 846), from each one of the plurality of antenna element means, a beam based on the phase shifted signal received from the associated phase shifting means, wherein beams output from the plurality of antenna element means are output with different beam angles relative to each other and have a phase difference (e.g., constant phase difference) between adjacent beams.

In one aspect, the aforementioned means may be the processor 804 shown in FIG. 8 configured to perform the functions recited by the aforementioned means. In another aspect, the aforementioned means may be a circuit or any apparatus configured to perform the functions recited by the aforementioned means. Of course, in the above examples, the circuitry included in the processor 804 is merely provided as an example, and other means for carrying out the described functions may be included within various aspects of the present disclosure, including but not limited to the instructions stored in the computer-readable storage medium 806, or any other suitable apparatus or means described in any one of the FIG. 1, 7, 11, or 12 and utilizing, for example, the processes and/or algorithms described herein in relation to FIG. 9.

Figure 10:
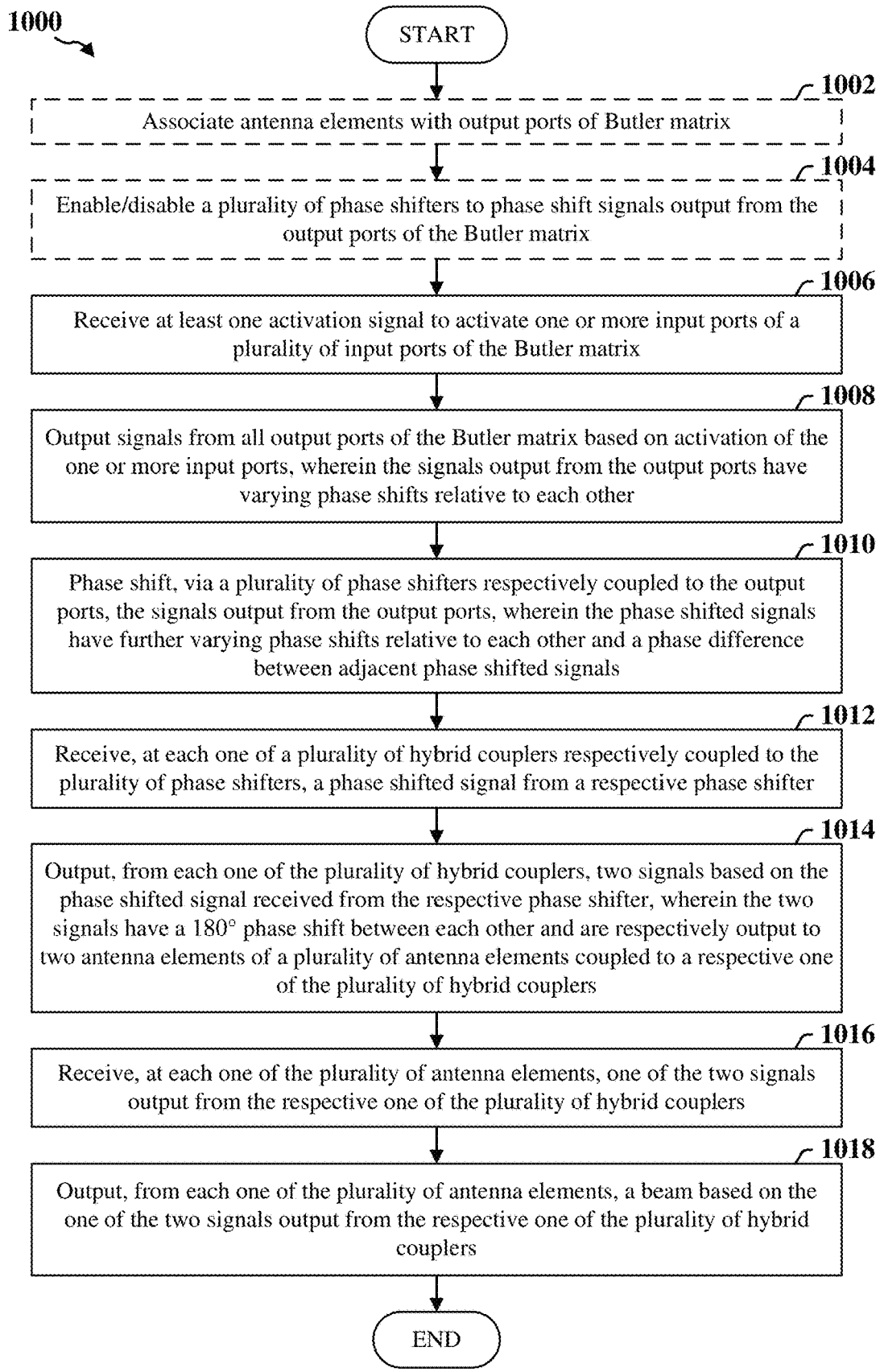
FIG. 10 is a flow chart illustrating another exemplary process for multi-antenna wireless communication in accordance with aspects of the present disclosure.

FIG. 10 is a flow chart illustrating another exemplary process 1000 for multi-antenna wireless communication in accordance with aspects of the present disclosure. As described below, some or all illustrated features may be omitted in a particular implementation within the scope of the present disclosure, and some illustrated features may not be required for implementation of all aspects. In some examples, the process 1000 may be carried out by the device 800 illustrated in FIG. 8, which may be a UE or base station, as illustrated in any one or more of FIG. 1, 7, 11, or 12. In some examples, the process 1000 may be carried out by any suitable apparatus or means for carrying out the functions or algorithm described below.

At block 1002, the device may associate, via a switching/enabling circuit (e.g., switching/enabling circuitry 840 and/or switches 1192/1292), a plurality of antenna elements (e.g., antennas 614) of an antenna array with output ports (e.g., output ports 606) of a Butler matrix (e.g., Butler matrix 602). The switching circuit configures the device into a reception mode for signal reception by the antenna array and into a transmission mode for signal transmission by the antenna array. At block 1004, the device may also enable, via the switching/enabling circuit, a plurality of phase shifters (e.g., phase shifters 610) to respectively phase shift the signals output from the output ports. The device may further disable (via the switching/enabling circuit) the plurality of phase shifters from respectively phase shifting the signals output from the output ports if desired.

At block 1006, the device may receive at least one activation signal to activate one or more input ports (e.g., input ports 608) of a plurality of input ports of the Butler matrix. In an aspect, receiving the at least one activation signal activates different input ports.

At block 1008, the device may output signals from all output ports of the Butler matrix based on activation of the one or more input ports. The signals output from the output ports have varying phase shifts relative to each other. In an aspect, outputting the signals from all output ports includes outputting the signals in a different phase pattern based on the activation of the different input ports. In another aspect, the signals output from the output ports have a uniform phase distribution and a phase difference (e.g., constant phase difference) between adjacent signals.

At block 1010, the device may phase shift, via the plurality of phase shifters (e.g., phase shifters 610) respectively coupled to the output ports, the signals output from the output ports. The phase shifted signals have further varying phase shifts relative to each other and a phase difference (e.g., constant phase difference) between adjacent phase shifted signals.

In an aspect, a plurality of hybrid couplers (e.g., 180° hybrid couplers 604) are respectively coupled to the plurality of phase shifters. Each hybrid coupler may further be coupled to two antenna elements of the plurality of antenna elements (e.g., antennas 614). Accordingly, at block 1012, the device may receive, at each one of the plurality of hybrid couplers, a phase shifted signal from a respective phase shifter. Moreover, at block 1014, the device may output, from each one of the plurality of hybrid couplers, two signals based on the phase shifted signal received from the respective phase shifter. The two signals have a 180° phase shift between each other and are respectively output to the two antenna elements of the plurality of antenna elements coupled to a respective one of the plurality of hybrid couplers. At block 1016, the device may receive, at each one of the plurality of antenna elements, one of the two signals output from the respective one of the plurality of hybrid couplers. At block 1018, the device may output, from each one of the plurality of antenna elements, a beam based on the one of the two signals output from the respective one of the plurality of hybrid couplers. Beams output from the plurality of antenna elements are output with different beam angles relative to each other and have a phase difference (e.g., constant phase difference) between adjacent beams. In an aspect, a quantity of the plurality of antenna elements (e.g., 16 antenna elements) is twice a quantity of the plurality of phase shifters (e.g., 8 phase shifters).

In one configuration, the device 800 for wireless communication includes means for associating (e.g., switching/enabling circuitry 840 and/or switches 1192/1292) a plurality of antenna element means for outputting a beam (e.g. antennas 614, antenna array 830, or antenna array 144) with output ports of a Butler matrix, means for enabling/means for disabling (e.g., switching/enabling circuitry 840 and/or switches 1192/1292) a plurality of phase shifting means to respectively phase shift signals output from the output ports, means for receiving at least one activation signal (e.g., Butler matrix 602 and/or Butler matrix activating circuit 842) to activate one or more input ports of a plurality of input ports of a Butler matrix, means for outputting (e.g., Butler matrix 602 and/or Butler matrix activating circuit 842) signals from all output ports of the Butler matrix based on one or more activated input ports, wherein the signals output from the output ports have varying phase shifts relative to each other, for a plurality of phase shifting means respective coupled to the output ports of the Butler matrix (e.g., phase shifters 610, phase shifting/hybrid coupling circuitry 844, and/or phase shifter 816) for respectively phase shifting the signals output from the output ports, wherein the phase shifted signals have further varying phase shifts relative to each other and a phase difference (e.g., constant phase difference) between adjacent phase shifted signals, means for receiving (e.g., 180° hybrid couplers 604, phase shifting/hybrid coupling circuitry 844, and/or phase shifter 816), at each one of a plurality of hybrid coupling means, a phase shifted signal from a respective phase shifting means, means for outputting (e.g., 180° hybrid couplers 604, phase shifting/hybrid coupling circuitry 844, and/or phase shifter 816), from each one of the plurality of hybrid coupling means, two signals based on the phase shifted signal received from the respective phase shifting means, wherein the two signals have a 180° phase shift between each other and are respectively output to two antenna element means of the plurality of antenna element means, means for receiving (e.g., antennas 614, antenna array 830, antenna array 144, and/or beam outputting circuitry 846), at each one of the plurality of antenna element means, one of the two signals output from a respective one of the plurality of hybrid coupling means, and means for outputting (e.g., antennas 614, antenna array 830, antenna array 144, and/or beam outputting circuitry 840), from each one of the plurality of antenna element means, a beam based on the one of the two signals output from the respective one of the plurality of hybrid coupling means, wherein beams output from the plurality of antenna element means are output with different beam angles relative to each other and have a phase difference (e.g., constant phase difference) between adjacent beams.

In one aspect, the aforementioned means may be the processor 804 shown in FIG. 8 configured to perform the functions recited by the aforementioned means. In another aspect, the aforementioned means may be a circuit or any apparatus configured to perform the functions recited by the aforementioned means. Of course, in the above examples, the circuitry included in the processor 804 is merely provided as an example, and other means for carrying out the described functions may be included within various aspects of the present disclosure, including but not limited to the instructions stored in the computer-readable storage medium 806, or any other suitable apparatus or means described in any one of the FIG. 1, 7, 11, or 12 and utilizing, for example, the processes and/or algorithms described herein in relation to FIG. 10.

Figure 11:
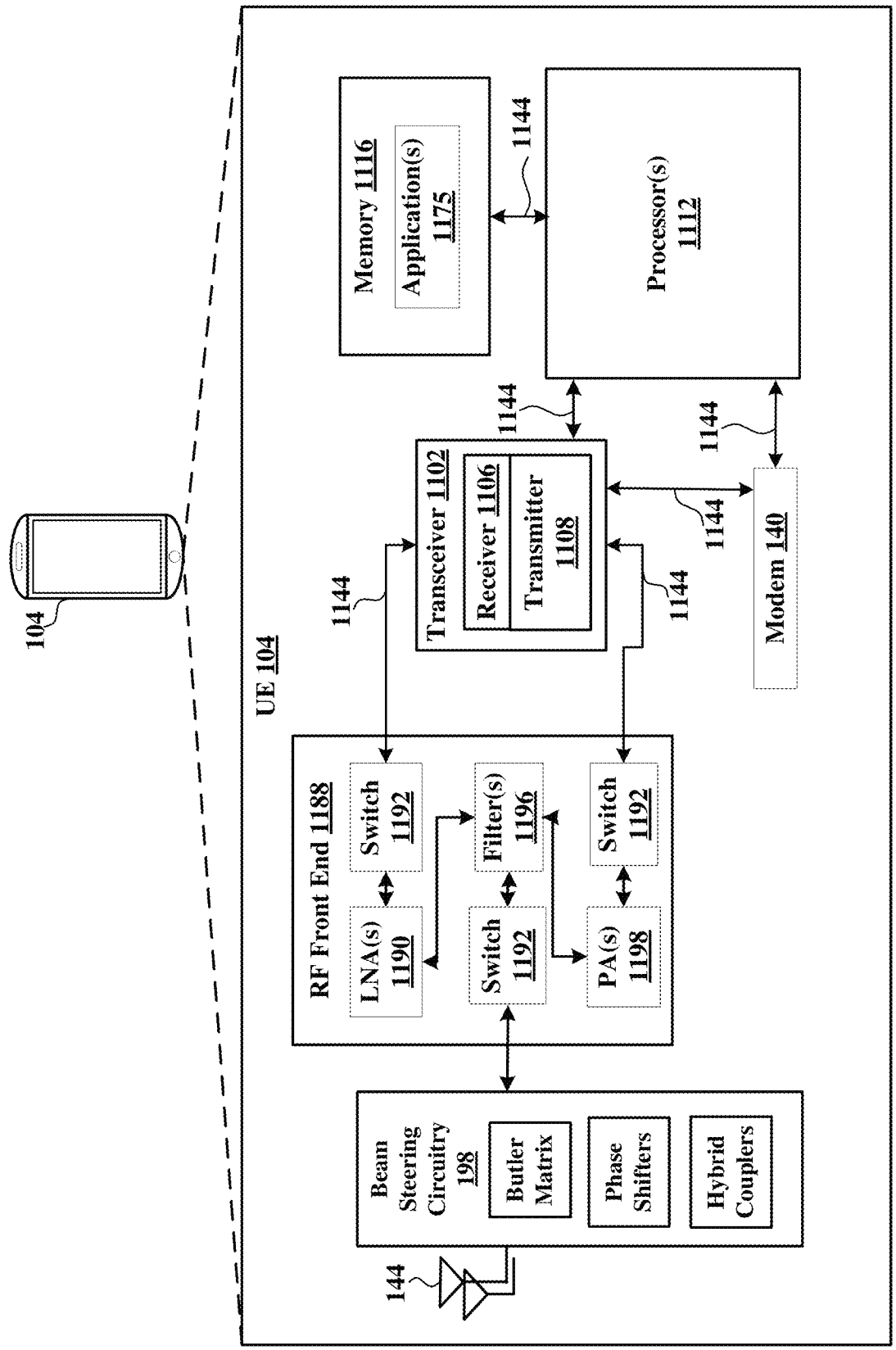
FIG. 11 is a block diagram illustrating example components of an example UE in accordance with aspects of the present disclosure.

FIG. 11 illustrates one example implementation of UE 104 that may include a variety of components, some of which have already been described above and are described further herein, including components such as one or more processors 1112, memory 1116, and transceiver 1102 in communication via one or more buses 1144, which may operate in conjunction with modem 140, antenna array 144, and/or beam steering circuitry 198 to enable one or more of the functions described herein related to beam steering in multi-antenna wireless communication. In FIG. 11, the beam steering circuitry 198 including, e.g., a Butler matrix, phase shifters, and/or hybrid couplers, as described above, is configured and arranged to couple antenna array 144 with an RF front end 1188 of the UE 104. However, the present aspects are not so limited. For example, in an alternative aspect, the beam steering circuitry 198 may be configured and arranged to couple RF front end 1188 with transceiver 1102.

In an aspect, the one or more processors 1112 can include a modem 140 and/or can be part of the modem 140 that uses one or more modem processors. Thus, the various functions described herein with reference to beamforming may be included in modem 140 and/or processors 1112 and, in an aspect, can be executed by a single processor, while in other aspects, different ones of the functions may be executed by a combination of two or more different processors. For example, in an aspect, the one or more processors 1112 may include any one or any combination of a modem processor, or a baseband processor, or a digital signal processor, or a transmit processor, or a receiver processor, or a transceiver processor associated with transceiver 1102. In other aspects, some of the features of the one or more processors 1112 and/or modem 140 described herein with reference to beamforming may be performed by transceiver 1102.

Also, memory 1116 may be configured to store data used herein and/or local versions of applications 1175 being executed by at least one processor 1112. Memory 1116 can include any type of computer-readable medium usable by a computer or at least one processor 1112, such as random access memory (RAM), read only memory (ROM), tapes, magnetic discs, optical discs, volatile memory, non-volatile memory, and any combination thereof. In an aspect, for example, memory 1116 may be a non-transitory computer-readable storage medium that stores one or more computer-executable codes and/or data associated therewith, when UE 104 is operating at least one processor 1112 to execute beamforming functionality described herein.

Transceiver 1102 may include at least one receiver 1106 and at least one transmitter 1108. Receiver 1106 may include hardware, firmware, and/or software code executable by a processor for receiving data, the code comprising instructions and being stored in a memory (e.g., computer-readable medium). Receiver 1106 may be, for example, a radio frequency (RF) receiver. In an aspect, receiver 1106 may receive signals transmitted by at least one base station 102. Additionally, receiver 1106 may process such received signals, and also may obtain measurements of the signals, such as, but not limited to, Ec/Io, signal-to-noise ratio (SNR), reference signal received power (RSRP), received signal strength indicator (RSSI), etc. Transmitter 1108 may include hardware, firmware, and/or software code executable by a processor for transmitting data, the code comprising instructions and being stored in a memory (e.g., computer-readable medium). A suitable example of transmitter 1108 may include, but is not limited to, an RF transmitter.

Moreover, in an aspect, UE 104 may include RF front end 1188, which may operate in communication with the beam steering circuitry 198, one or more antennas 144, and transceiver 1102 for receiving and transmitting radio transmissions, for example, wireless communications transmitted by at least one base station 102 or wireless transmissions transmitted by UE 104. RF front end 1188 may be connected to one or more antennas 144 via the beam steering circuitry 198 and can include one or more low-noise amplifiers (LNAs) 1190, one or more switches 1192, one or more power amplifiers (PAs) 1198, and one or more filters 1196 for transmitting and receiving RF signals.

In an aspect, LNA 1190 can amplify a received signal at a desired output level. In an aspect, each LNA 1190 may have a specified minimum and maximum gain values. In an aspect, RF front end 1188 may use one or more switches 1192 to select a particular LNA 1190 and its specified gain value based on a desired gain value for a particular application.

Further, for example, one or more PA(s) 1198 may be used by RF front end 1188 to amplify a signal for an RF output at a desired output power level. In an aspect, each PA 1198 may have specified minimum and maximum gain values. In an aspect, RF front end 1188 may use one or more switches 1192 to select a particular PA 1198 and its specified gain value based on a desired gain value for a particular application.

Also, for example, one or more filters 1196 can be used by RF front end 1188 to filter a received signal to obtain an input RF signal. Similarly, in an aspect, for example, a respective filter 1196 can be used to filter an output from a respective PA 1198 to produce an output signal for transmission. In an aspect, each filter 1196 can be connected to a specific LNA 1190 and/or PA 1198. In an aspect, RF front end 1188 can use one or more switches 1192 to select a transmit or receive path using a specified filter 1196, LNA 1190, and/or PA 1198, based on a configuration as specified by transceiver 1102 and/or processor 1112.

As such, transceiver 1102 may be configured to transmit and receive wireless signals through one or more antennas 144 via the beam steering circuitry 198 and RF front end 1188. In an aspect, transceiver 1102 may be tuned to operate at specified frequencies such that UE 104 can communicate with, for example, one or more base stations 102 or one or more cells associated with one or more base stations 102. In an aspect, for example, modem 140 can configure transceiver 1102 to operate at a specified frequency and power level based on the UE configuration of the UE 104 and the communication protocol used by modem 140.

In an aspect, modem 140 can be a multiband-multimode modem, which can process digital data and communicate with transceiver 1102 such that the digital data is sent and received using transceiver 1102. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 104 (e.g., RF front end 1188, transceiver 1102, beam steering circuitry 198) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the processor(s) 1112 may correspond to one or more of the processors described in connection with the UE 750 in FIG. 7 and/or the device 800 in FIG. 8 above. Similarly, the memory 1116 may correspond to the memory described in connection with the UE 750 in FIG. 7 and/or the device 800 in FIG. 8 above.

In one configuration, UE 104, UE 750, or device 800 may be an apparatus for multi-antenna wireless communication including means for performing any of the appended claims for multi-antenna wireless communication by a UE. The aforementioned means may be one or more of the aforementioned components of UE 104 and/or processor 1112 of UE 104 configured to perform the functions recited by the aforementioned means. As described supra, processor 1112 may include the TX Processor 768, the RX Processor 756, and the controller/processor 759 of UE 750 described above with reference to FIG. 7. As such, in one configuration, the aforementioned means may be the TX Processor 768, the RX Processor 756, and the controller/processor 759 configured to perform the functions recited by the aforementioned means.

Figure 12:
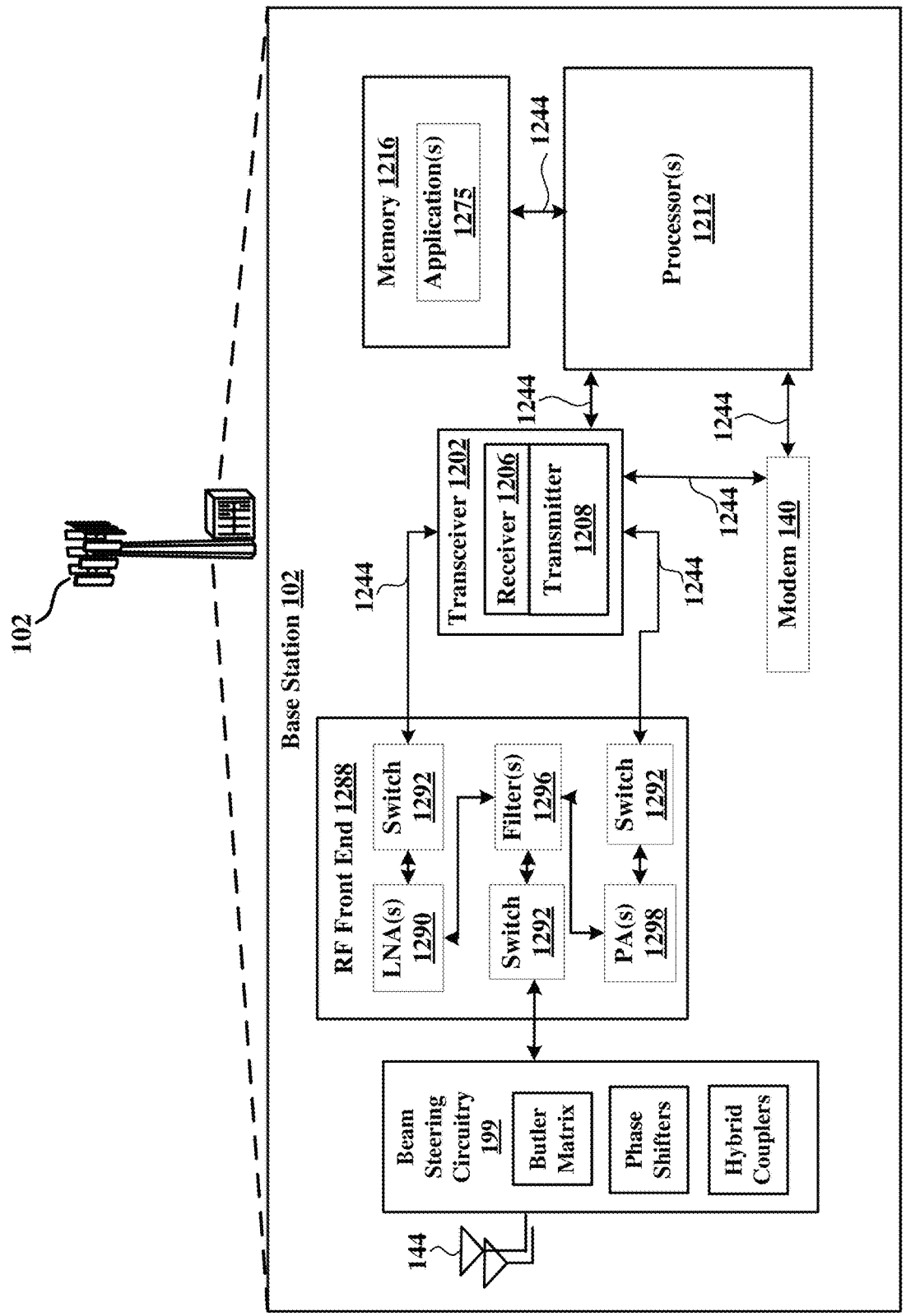
FIG. 12 is a block diagram illustrating example components of an example base station in accordance with aspects of the present disclosure.

FIG. 12 illustrates one example implementation of base station 102 that may include a variety of components, some of which have already been described above and are described further herein, including components such as one or more processors 1212, memory 1216, and transceiver 1202 in communication via one or more buses 1244, which may operate in conjunction with modem 140, antenna array 144, and/or beam steering circuitry 199 to enable one or more of the functions described herein related to beamforming in multi-antenna wireless communication. In FIG. 12, the beam steering circuitry 199 including, e.g., a Butler matrix, phase shifters, and/or hybrid couplers, as described above, is configured and arranged to couple antenna array 144 with an RF front end 1288 of the base station 102. However, the present aspects are not so limited. For example, in an alternative aspect, the beam steering circuitry 199 may be configured and arranged to couple RF front end 1288 with transceiver 1202.

In an aspect, the one or more processors 1212 can include a modem 140 and/or can be part of the modem 140 that uses one or more modem processors. Thus, the various functions described herein with reference to beamforming may be included in modem 140 and/or processors 1212 and, in an aspect, can be executed by a single processor, while in other aspects, different ones of the functions may be executed by a combination of two or more different processors. For example, in an aspect, the one or more processors 1212 may include any one or any combination of a modem processor, or a baseband processor, or a digital signal processor, or a transmit processor, or a receiver processor, or a transceiver processor associated with transceiver 1202. In other aspects, some of the features of the one or more processors 1212 and/or modem 140 described herein with reference to beamforming may be performed by transceiver 1202.

Also, memory 1216 may be configured to store data used herein and/or local versions of applications 1275 being executed by at least one processor 1212. Memory 1216 can include any type of computer-readable medium usable by a computer or at least one processor 1212, such as random access memory (RAM), read only memory (ROM), tapes, magnetic discs, optical discs, volatile memory, non-volatile memory, and any combination thereof. In an aspect, for example, memory 1216 may be a non-transitory computer-readable storage medium that stores one or more computer-executable codes and/or data associated therewith, when base station 102 is operating at least one processor 1212 to execute beamforming functionality described herein.

Transceiver 1202 may include at least one receiver 1206 and at least one transmitter 1208. Receiver 1206 may include hardware, firmware, and/or software code executable by a processor for receiving data, the code comprising instructions and being stored in a memory (e.g., computer-readable medium). Receiver 1206 may be, for example, a radio frequency (RF) receiver. In an aspect, receiver 1206 may receive signals transmitted by at least one UE 104. Additionally, receiver 1206 may process such received signals, and also may obtain measurements of the signals, such as, but not limited to, Ec/Io, signal-to-noise ratio (SNR), reference signal received power (RSRP), received signal strength indicator (RSSI), etc. Transmitter 1208 may include hardware, firmware, and/or software code executable by a processor for transmitting data, the code comprising instructions and being stored in a memory (e.g., computer-readable medium). A suitable example of transmitter 1208 may including, but is not limited to, an RF transmitter.

Moreover, in an aspect, base station 102 may include RF front end 1288, which may operate in communication with the beam steering circuitry 199, one or more antennas 144, and transceiver 1202 for receiving and transmitting radio transmissions, for example, wireless communications transmitted by other base stations 102 or wireless transmissions transmitted by UE 104. RF front end 1288 may be connected to one or more antennas 144 via the beam steering circuitry 199 and can include one or more low-noise amplifiers (LNAs) 1290, one or more switches 1292, one or more power amplifiers (PAs) 1298, and one or more filters 1296 for transmitting and receiving RF signals.

In an aspect, LNA 1290 can amplify a received signal at a desired output level. In an aspect, each LNA 1290 may have a specified minimum and maximum gain values. In an aspect, RF front end 1288 may use one or more switches 1292 to select a particular LNA 1290 and its specified gain value based on a desired gain value for a particular application.

Further, for example, one or more PA(s) 1298 may be used by RF front end 1288 to amplify a signal for an RF output at a desired output power level. In an aspect, each PA 1298 may have specified minimum and maximum gain values. In an aspect, RF front end 1288 may use one or more switches 1292 to select a particular PA 1298 and its specified gain value based on a desired gain value for a particular application.

Also, for example, one or more filters 1296 can be used by RF front end 1288 to filter a received signal to obtain an input RF signal. Similarly, in an aspect, for example, a respective filter 1296 can be used to filter an output from a respective PA 1298 to produce an output signal for transmission. In an aspect, each filter 1296 can be connected to a specific LNA 1290 and/or PA 1298. In an aspect, RF front end 1288 can use one or more switches 1292 to select a transmit or receive path using a specified filter 1296, LNA 1290, and/or PA 1298, based on a configuration as specified by transceiver 1202 and/or processor 1212.

As such, transceiver 1202 may be configured to transmit and receive wireless signals through one or more antennas 144 via the beam steering circuitry 199 and RF front end 1288. In an aspect, transceiver 1202 may be tuned to operate at specified frequencies such that base station 102 can communicate with, for example, one or more UEs 104 or one or more cells associated with one or more other base stations 102. In an aspect, for example, modem 140 can configure transceiver 1202 to operate at a specified frequency and power level based on the base station configuration of the base station 102 and the communication protocol used by modem 140.

In an aspect, modem 140 can be a multiband-multimode modem, which can process digital data and communicate with transceiver 1202 such that the digital data is sent and received using transceiver 1202. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of base station 102 (e.g., RF front end 1288, transceiver 1202, beam steering circuitry 199) to enable transmission and/or reception of signals from the network based on a specified modem configuration. In an aspect, the modem configuration can be based on the mode of the modem and the frequency band in use. In another aspect, the modem configuration can be based on base station configuration information associated with base station 102.

In an aspect, the processor(s) 1212 may correspond to one or more of the processors described in connection with the base station 710 in FIG. 7 and/or the device 800 in FIG. 8 above. Similarly, the memory 1216 may correspond to the memory described in connection with the base station 710 in FIG. 7 and/or the device 800 in FIG. 8 above.

In one configuration, base station 102, base station 1110, or device 800 may be an apparatus for multi-antenna wireless communication including means for performing any of the appended claims for multi-antenna wireless communication by a base station. The aforementioned means may be one or more of the aforementioned components of base station 102 and/or processor 1212 of base station 102 configured to perform the functions recited by the aforementioned means. As described supra, processor 1212 may include the TX Processor 716, the RX Processor 770, and the controller/processor 775 of base station 1110 described above with reference to FIG. 7. As such, in one configuration, the aforementioned means may be the TX Processor 716, the RX Processor 770, and the controller/processor 775 configured to perform the functions recited by the aforementioned means.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-12 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The following provides an overview of aspects of the present disclosure:

Aspect 1: A method of multi-antenna wireless communication, comprising: receiving at least one activation signal to activate one or more input ports of a plurality of input ports of a Butler matrix; outputting signals from all output ports of the Butler matrix based on activation of the one or more input ports, wherein the signals output from the output ports have varying phase shifts relative to each other; and phase shifting, via a plurality of phase shifters respectively coupled to the output ports, the signals output from the output ports, wherein the phase shifted signals have further varying phase shifts relative to each other and a phase difference between adjacent phase shifted signals.

Aspect 2: The method of aspect 1, wherein: the receiving the at least one activation signal activates different input ports; and the outputting the signals from all output ports comprises outputting the signals in a different phase pattern based on the activation of the different input ports.

Aspect 3: The method of aspect 1 or 2, wherein the signals output from the output ports have a uniform phase distribution and a phase difference between adjacent signals.

Aspect 4: The method of any one of aspects 1 through 3, further comprising: receiving, at each one of a plurality of antenna elements respectively associated with the plurality of phase shifters, a phase shifted signal from an associated phase shifter; and outputting, from each one of the plurality of antenna elements, a beam based on the phase shifted signal received from the associated phase shifter, wherein beams output from the plurality of antenna elements are output with different beam angles relative to each other and have a phase difference between adjacent beams.

Aspect 5: The method of any one of aspects 1 through 4, wherein a quantity of the plurality of antenna elements is equal to a quantity of the plurality of phase shifters.

Aspect 6: The method of any one of aspects 1 through 3, further comprising: receiving, at each one of a plurality of hybrid couplers respectively coupled to the plurality of phase shifters, a phase shifted signal from a respective phase shifter; outputting, from each one of the plurality of hybrid couplers, two signals based on the phase shifted signal received from the respective phase shifter, wherein the two signals have a 180° phase shift between each other and are respectively output to two antenna elements of a plurality of antenna elements coupled to a respective one of the plurality of hybrid couplers; receiving, at each one of the plurality of antenna elements, one of the two signals output from the respective one of the plurality of hybrid couplers; and outputting, from each one of the plurality of antenna elements, a beam based on the one of the two signals output from the respective one of the plurality of hybrid couplers, wherein beams output from the plurality of antenna elements are output with different beam angles relative to each other and have a phase difference between adjacent beams.

Aspect 7: The method of any one of aspects 1 through 3 and 6, wherein a quantity of the plurality of antenna elements is twice a quantity of the plurality of phase shifters.

Aspect 8: The method of any one of aspects 1 through 7, further comprising: enabling the plurality of phase shifters to respectively phase shift the signals output from the output ports; or disabling the plurality of phase shifters from respectively phase shifting the signals output from the output ports.

Aspect 9: The method of any one of aspects 1 through 8, further comprising associating, via a switching circuit, the plurality of antenna elements with the output ports of the Butler matrix, wherein the switching circuit is configurable into a reception mode for signal reception by the antenna array and configurable into a transmission mode for signal transmission by the antenna array.

Aspect 10: A UE or base station comprising at least one processor, and a memory coupled to the at least one processor, the at least one processor and the memory configured to perform a method of any one of aspects 1 through 9.

Aspect 11: A UE or base station comprising at least one means for performing a method of any one of aspects 1 through 9.

Aspect 12: A non-transitory computer-readable medium storing code at a UE or base station, the code comprising instructions executable by a processor to perform a method of any one of aspects 1 through 9.

What is claimed is:

1. An apparatus for wireless communication at a device, comprising:
one or more Butler matrices including input ports and output ports, wherein the one or more Butler matrices are configured to cause the device to:
receive at least one activation signal to activate one or more of the input ports; and
output signals from all of the output ports based on one or more activated input ports, wherein the signals output from the output ports have varying phase shifts relative to each other;
a plurality of phase shifters respectively coupled to the output ports of the one or more Butler matrices and configured to cause the device to respectively phase shift the signals output from the output ports, wherein the phase shifted signals are configured to have further varying phase shifts relative to each other and a phase difference between adjacent phase shifted signals; and
a plurality of hybrid couplers respectively coupled to the plurality of phase shifters, wherein each one of the plurality of hybrid couplers is situated external to the one or more Butler matrices and between the plurality of phase shifters and a plurality of antenna elements, and wherein each hybrid coupler is configured to cause the device to:
receive a phase shifted signal from a respective phase shifter; and
output two or more signals based on the phase shifted signal received from the respective phase shifter, wherein the two or more signals have a phase shift between each other.

2. The apparatus of claim 1, wherein the one or more Butler matrices are further configured to cause the device to:
receive the at least one activation signal to activate different input ports; and
output the signals from all of the output ports in a different phase pattern based on different activated input ports.

3. The apparatus of claim 1, wherein the signals output from the output ports have a uniform phase distribution and a phase difference between adjacent signals.

4. The apparatus of claim 1, wherein the one or more Butler matrices, the plurality of phase shifters, and the plurality of hybrid couplers are coupled to:
a transceiver; and
an antenna array including the plurality of antenna elements,
wherein each one of the plurality of antenna elements is associated with one hybrid coupler of the plurality of hybrid couplers.

5. The apparatus of claim 4, wherein each one of the plurality of antenna elements is configured to cause the device to:
receive one signal of the two or more signals from an associated hybrid coupler; and
output a beam based on the one signal received from the associated hybrid coupler,
wherein beams output from the plurality of antenna elements are output with different beam angles relative to each other and have a phase difference between adjacent beams.

6. The apparatus of claim 4, wherein a quantity of the plurality of antenna elements is equal to a quantity of the plurality of phase shifters.

7. The apparatus of claim 4, wherein a quantity of the plurality of antenna elements is twice a quantity of the plurality of phase shifters,
wherein each hybrid coupler is further coupled to two antenna elements of the plurality of antenna elements, wherein each one of the plurality of hybrid couplers is configured to cause the device to:
output two signals based on the phase shifted signal received from the respective phase shifter, wherein the two signals have a 180° phase shift between each other and are respectively output to the two antenna elements,
wherein each one of the plurality of antenna elements is configured to cause the device to:
receive one of the two signals output from a coupled hybrid coupler, and
output a beam based on the one of the two signals output from the coupled hybrid coupler, and wherein beams output from the plurality of antenna elements are output with different beam angles relative to each other and have a phase difference between adjacent beams.

8. The apparatus of claim 4, further comprising:
a switching circuit configured to cause the device to associate the plurality of antenna elements with the output ports of the one or more Butler matrices,
wherein the switching circuit is configurable into a reception mode for signal reception by the antenna array and configurable into a transmission mode for signal transmission by the antenna array.

9. The apparatus of claim 1, further comprising an enabling circuit configured to cause the device to:
enable the plurality of phase shifters to respectively phase shift the signals output from the output ports; and
disable the plurality of phase shifters from respectively phase shifting the signals output from the output ports.

10. A method of wireless communication at a device, comprising:
receiving at least one activation signal to activate one or more input ports of a plurality of input ports of one or more Butler matrices;
outputting signals from all output ports of the one or more Butler matrices based on activation of the one or more input ports, wherein the signals output from the output ports have varying phase shifts relative to each other;
phase shifting, via a plurality of phase shifters respectively coupled to the output ports, the signals output from the output ports, wherein the phase shifted signals have further varying phase shifts relative to each other and a phase difference between adjacent phase shifted signals;
receiving, at each one of a plurality of hybrid couplers respectively coupled to the plurality of phase shifters, a phase shifted signal from a respective phase shifter, wherein each one of the plurality of hybrid couplers is situated external to the one or more Butler matrices and between the plurality of phase shifters and a plurality of antenna elements; and
outputting, from each one of the plurality of hybrid couplers, two or more signals based on the phase shifted signal received from the respective phase shifter, wherein the two or more signals have a phase shift between each other.

11. The method of claim 10, wherein:
the receiving the at least one activation signal activates different input ports; and
the outputting the signals from all output ports comprises outputting the signals in a different phase pattern based on the activation of the different input ports.

12. The method of claim 10, wherein the signals output from the output ports have a uniform phase distribution and a phase difference between adjacent signals.

13. The method of claim 10, further comprising:
receiving, at each one of the plurality of antenna elements associated with one hybrid coupler of the plurality of hybrid couplers, one signal of the two or more signals from an associated hybrid coupler; and
outputting, from each one of the plurality of antenna elements, a beam based on the one signal received from the associated hybrid coupler,
wherein beams output from the plurality of antenna elements are output with different beam angles relative to each other and have a phase difference between adjacent beams.

14. The method of claim 13, wherein a quantity of the plurality of antenna elements is equal to a quantity of the plurality of phase shifters.

15. The method of claim 10, further comprising:
outputting, from each one of the plurality of hybrid couplers, two signals based on the phase shifted signal received from the respective phase shifter, wherein the two signals have a 180° phase shift between each other and are respectively output to two antenna elements of the plurality of antenna elements coupled to an associated one of the plurality of hybrid couplers;
receiving, at each one of the plurality of antenna elements, one of the two signals output from the respective one of the plurality of hybrid couplers; and
outputting, from each one of the plurality of antenna elements, a beam based on the one of the two signals output from the respective one of the plurality of hybrid couplers,
wherein beams output from the plurality of antenna elements are output with different beam angles relative to each other and have a phase difference between adjacent beams.

16. The method of claim 15, wherein a quantity of the plurality of antenna elements is twice a quantity of the plurality of phase shifters.

17. The method of claim 10, further comprising:
enabling the plurality of phase shifters to respectively phase shift the signals output from the output ports; or
disabling the plurality of phase shifters from respectively phase shifting the signals output from the output ports.

18. An apparatus for wireless communication at a device, comprising:
means for receiving at least one activation signal to activate one or more input port means of a plurality of input port means of one or more Butler matrices means;
means for outputting signals from all output port means of the one or more Butler matrices means based on one or more activated input port means, wherein the signals output from the output port means have varying phase shifts relative to each other;
a plurality of phase shifting means respectively coupled to the output port means of the one or more Butler matrices means for respectively phase shifting the signals output from the output port means, wherein the phase shifted signals are configured to have further varying phase shifts relative to each other and a phase difference between adjacent phase shifted signals;
means for receiving, at each one of a plurality of hybrid coupling means respectively coupled to the plurality of phase shifting means, a phase shifted signal from a respective phase shifting means, wherein each one of the plurality of hybrid coupling means is situated external to the one or more Butler matrices means and between the plurality of phase shifting means and a plurality of antenna element means for outputting a beam; and
means for outputting, from each one of the plurality of hybrid coupling means, two or more signals based on the phase shifted signal received from the respective phase shifting means, wherein the two or more signals have a phase shift between each other.

19. The apparatus of claim 18, wherein:
the means for receiving the at least one activation signal is configured to activate different input port means; and the means for outputting the signals is configured to output the signals from all of the output port means in a different phase pattern based on different activated input port means.

20. The apparatus of claim 18, wherein the signals output from the output port means have a uniform phase distribution and a phase difference between adjacent signals.

21. The apparatus of claim 18, wherein each one of the plurality of antenna element means for outputting a beam is associated with one hybrid coupling means of the plurality of hybrid coupling means, the apparatus further comprising:
means for receiving, at each one of the plurality of antenna element means, one signal of the two or more signals from an associated hybrid coupling means; and
means for outputting, from each one of the plurality of antenna element means, a beam based on the one signal received from the associated hybrid coupling means,
wherein beams output from the plurality of antenna element means are output with different beam angles relative to each other and have a phase difference between adjacent beams.

22. The apparatus of claim 21, wherein a quantity of the plurality of antenna element means is equal to a quantity of the plurality of phase shifting means.

23. The apparatus of claim 18, wherein each hybrid coupling means is further coupled to two antenna element means of the plurality of antenna element means for outputting a beam, the apparatus further comprising:
means for outputting, from each one of the plurality of hybrid coupling means, two signals based on the phase shifted signal received from the respective phase shifting means, wherein the two signals have a 180° phase shift between each other and are respectively output to the two antenna element means;
means for receiving, at each one of the plurality of antenna element means, one of the two signals output from the respective one of the plurality of hybrid coupling means; and
means for outputting, from each one of the plurality of antenna element means, a beam based on the one of the two signals output from the respective one of the plurality of hybrid coupling means,
wherein beams output from the plurality of antenna element means are output with different beam angles relative to each other and have a phase difference between adjacent beams.

24. The apparatus of claim 23, wherein a quantity of the plurality of antenna element means is twice a quantity of the plurality of phase shifting means.

25. The apparatus of claim 18, further comprising:
means for enabling the plurality of phase shifting means to respectively phase shift the signals output from the output port means; or
means for disabling the plurality of phase shifting means from respectively phase shifting the signals output from the output port means.

26. A non-transitory computer-readable medium storing code at a device, the code comprising instructions executable by one or more processors to cause the device to:
receive at least one activation signal to activate one or more input ports of a plurality of input ports of one or more Butler matrices;
output signals from all output ports of the one or more Butler matrices based on one or more activated input ports, wherein the signals output from the output ports have varying phase shifts relative to each other;
phase shift, via a plurality of phase shifters respectively coupled to the output ports, the signals output from the output ports, wherein the phase shifted signals are configured to have further varying phase shifts relative to each other and a phase difference between adjacent phase shifted signals;
receive, at each one of a plurality of hybrid couplers respectively coupled to the plurality of phase shifters, a phase shifted signal from a respective phase shifter, wherein each one of the plurality of hybrid couplers is situated external to the one or more Butler matrices and between the plurality of phase shifters and a plurality of antenna elements; and
output, from each one of the plurality of hybrid couplers, two or more signals based on the phase shifted signal received from the respective phase shifter, wherein the two or more signals have a phase shift between each other.

27. The non-transitory computer-readable medium of claim 26, wherein:
the instructions executable by the one or more processors to cause the device to receive the at least one activation signal activates different input ports; and
the instructions executable by the one or more processors to cause the device to output the signals outputs the signals from all of the output ports in a different phase pattern based on different activated input ports.

28. The non-transitory computer-readable medium of claim 26, wherein the signals output from the output ports have a uniform phase distribution and a phase difference between adjacent signals.

29. The non-transitory computer-readable medium of claim 26, further comprising code comprising instructions executable by the one or more processors to cause the device to:
receive, at each one of the plurality of antenna elements associated with one hybrid coupler of the plurality of hybrid couplers, one signal of the two or more signals from an associated hybrid coupler; and
output, from each one of the plurality of antenna elements, a beam based on the one signal received from the associated hybrid coupler,
wherein beams output from the plurality of antenna elements are output with different beam angles relative to each other and have a phase difference between adjacent beams.

30. The non-transitory computer-readable medium of claim 26, further comprising code comprising instructions executable by the one or more processors to cause the device to:
output, from each one of the plurality of hybrid couplers, two signals based on the phase shifted signal received from the respective phase shifter, wherein the two signals have a 180° phase shift between each other and are respectively output to two antenna elements of the plurality of antenna elements coupled to an associated one of the plurality of hybrid couplers;
receive, at each one of the plurality of antenna elements, one of the two signals output from the respective one of the plurality of hybrid couplers; and
output, from each one of the plurality of antenna elements, a beam based on the one of the two signals output from the respective one of the hybrid couplers,
wherein beams output from the plurality of antenna elements are output with different beam angles relative to each other and have a phase difference between adjacent beams.

* * * * *